(12) United States Patent
Brunswig et al.

(10) Patent No.: US 10,503,821 B2
(45) Date of Patent: Dec. 10, 2019

(54) DYNAMIC WORKFLOW ASSISTANT WITH SHARED APPLICATION CONTEXT

(71) Applicant: SAP SE, Walldorf (DE)

(72) Inventors: Frank Brunswig, Heidelberg (DE); Swarnava Chatterjee, Benares (IN); Gayathri D, Bangalore (IN); Rachel Ebner, Raanana (IL); Niels Hebling, Walldorf (DE); Joerg Goeppert, Karlsruhe (DE); Ioannis Grammatikakis, Maxdorf (DE); Christina Hall, Dielheim (DE); Klaus Herter, Leimen (DE); Steffen Huester, Ubstadt-Weiher (DE); Florian Jann, Heidelberg (DE); Matthias Kruse, Redwood City, CA (US); Hergen Siefken, Plankstadt (DE); Martin Steiner, San Francisco, CA (US)

(73) Assignee: SAP SE, Walldorf (DE)

( * ) Notice: Subject to any disclaimer, the term of this patent is extended or adjusted under 35 U.S.C. 154(b) by 242 days.

(21) Appl. No.: 15/362,731

(22) Filed: Nov. 28, 2016

(65) Prior Publication Data
US 2017/0185255 A1    Jun. 29, 2017

Related U.S. Application Data

(63) Continuation-in-part of application No. 14/981,917, filed on Dec. 29, 2015.
(Continued)

(51) Int. Cl.
*G06F 3/0484* (2013.01)
*G06F 17/24* (2006.01)
(Continued)

(52) U.S. Cl.
CPC .......... *G06F 17/241* (2013.01); *G06F 17/278* (2013.01); *G06Q 10/06311* (2013.01)

(58) Field of Classification Search
CPC .. G06F 3/0484; G06F 17/2705; G06F 17/278; G06F 17/24
See application file for complete search history.

(56) References Cited

U.S. PATENT DOCUMENTS

| 7,593,992 B2 | 9/2009 | Wodtke et al. |
| 7,606,162 B2 | 10/2009 | Herter et al. |

(Continued)

OTHER PUBLICATIONS

"SAP Fiori 2.0—Next generation business software." Red Dot Award: Design Concept. http://www.red-dot.sg/en/online-exhibition/sap-fiori-2-0/ (accessed at least as early as Jul. 20, 2016.).
(Continued)

*Primary Examiner* — Andrea C Leggett
(74) *Attorney, Agent, or Firm* — Klarquist Sparkman, LLP

(57) ABSTRACT

A workflow assistant can provide for improved memory aids and workflow management. The workflow assistant can retrieve context information from a base application to facilitate the creation of memory aids and workflow management items. Textual analysis can be applied to user input to determine data elements, data objects, assistant items, and collections that may be relevant to a memory or workflow aid. The workflow assistant can suggest actions for a user to take, such as based on text analysis of user input or the contents of a collection. Technical features such as a context analyzer that retrieves information from the base application for access by the workflow assistant can make the workflow assistant more dynamic and reduce the user interaction needed to create or modify a memory or workflow aid.

20 Claims, 13 Drawing Sheets

Related U.S. Application Data

(60) Provisional application No. 62/336,100, filed on May 13, 2016.

(51) Int. Cl.
  *G06Q 10/06* (2012.01)
  *G06F 17/27* (2006.01)

(56) References Cited

U.S. PATENT DOCUMENTS

| | | |
|---|---|---|
| 7,685,268 B2 | 3/2010 | Brunswig et al. |
| 7,757,208 B2 | 6/2010 | Degenkolb et al. |
| 7,860,768 B2 | 12/2010 | Herter et al. |
| 7,873,942 B2 | 1/2011 | Shaburov et al. |
| 7,885,847 B2 | 2/2011 | Wodtke et al. |
| 7,890,959 B2 | 2/2011 | Brunswig et al. |
| 7,908,290 B2 | 3/2011 | Herter et al. |
| 7,979,296 B2 | 7/2011 | Kruse et al. |
| 8,010,375 B2 | 8/2011 | Herter et al. |
| 8,095,472 B2 | 1/2012 | Springborn et al. |
| 8,239,447 B2 | 8/2012 | Garg et al. |
| 8,291,214 B2 | 10/2012 | Helfman et al. |
| 8,452,722 B2 | 5/2013 | Naeve et al. |
| 8,510,373 B2 | 8/2013 | Demant et al. |
| 8,516,364 B2 | 8/2013 | Demant et al. |
| 8,544,027 B2 | 9/2013 | Demant et al. |
| 8,555,249 B2 | 10/2013 | Demant et al. |
| 8,560,358 B2 | 10/2013 | Doerfler et al. |
| 8,589,883 B2 | 11/2013 | Demant et al. |
| 8,689,174 B2 | 4/2014 | Shaburov et al. |
| 8,694,544 B2 | 4/2014 | Demant et al. |
| 8,881,056 B2 | 11/2014 | Demant et al. |
| 8,930,441 B2 | 1/2015 | Demant et al. |
| 8,955,080 B2 | 2/2015 | Brunswig et al. |
| 9,244,697 B2 | 1/2016 | Schlarb et al. |
| 9,262,385 B2 | 2/2016 | Ebner |
| 9,277,028 B2 | 3/2016 | Ebner et al. |
| 9,306,922 B2 | 4/2016 | Herter et al. |
| 9,412,155 B2 | 8/2016 | Steiner et al. |
| 9,491,238 B2 | 11/2016 | Demant et al. |
| 9,491,266 B2 | 11/2016 | Bohlmann et al. |
| 2005/0027585 A1 | 2/2005 | Wodtke et al. |
| 2005/0033626 A1 | 2/2005 | Kruse et al. |
| 2005/0256798 A1 | 11/2005 | Herter et al. |
| 2005/0257197 A1 | 11/2005 | Herter et al. |
| 2006/0064671 A1 | 3/2006 | Herter et al. |
| 2006/0136873 A1 | 6/2006 | Herter et al. |
| 2006/0140202 A1 | 6/2006 | Garg et al. |
| 2006/0143270 A1 | 6/2006 | Wodtke et al. |
| 2006/0146727 A1 | 7/2006 | Herter et al. |
| 2007/0168753 A1 | 7/2007 | Herter et al. |
| 2007/0168936 A1 | 7/2007 | Shaburov et al. |
| 2008/0103843 A1 | 5/2008 | Goeppert et al. |
| 2008/0120129 A1 | 5/2008 | Seubert et al. |
| 2008/0162266 A1 | 7/2008 | Griessmann et al. |
| 2008/0163162 A1 | 7/2008 | Shaburov et al. |
| 2009/0043592 A1 | 2/2009 | Heimann et al. |
| 2009/0055796 A1 | 2/2009 | Springborn et al. |
| 2010/0076797 A1 | 3/2010 | Doerfler et al. |
| 2010/0153158 A1 | 6/2010 | Wex et al. |
| 2010/0193356 A1 | 8/2010 | Wahl et al. |
| 2011/0154226 A1 | 6/2011 | Guertler et al. |
| 2011/0161940 A1 | 6/2011 | Brunswig et al. |
| 2011/0161942 A1 | 6/2011 | Brunswig et al. |
| 2011/0161960 A1 | 6/2011 | Nos et al. |
| 2011/0162059 A1 | 6/2011 | Helfman et al. |
| 2011/0162074 A1 | 6/2011 | Helfman et al. |
| 2011/0307289 A1 | 12/2011 | Hosur et al. |
| 2012/0016894 A1 | 1/2012 | Brunswig et al. |
| 2012/0030612 A1 | 2/2012 | Aziz et al. |
| 2012/0054659 A1 | 3/2012 | Demant et al. |
| 2012/0060141 A1 | 3/2012 | Demant et al. |
| 2012/0110488 A1 | 5/2012 | Brunswig et al. |
| 2012/0123962 A2 | 5/2012 | Brunswig et al. |
| 2012/0144139 A1 | 6/2012 | Brunswig et al. |
| 2012/0158416 A1 | 6/2012 | Brunswig et al. |
| 2012/0159446 A1 | 6/2012 | Jentsch et al. |
| 2012/0166459 A1 | 6/2012 | Ritter et al. |
| 2012/0166984 A1 | 6/2012 | Brunswig et al. |
| 2012/0167056 A1 | 6/2012 | Brunswig et al. |
| 2013/0014080 A1 | 1/2013 | Brunswig et al. |
| 2013/0042219 A1 | 2/2013 | Said et al. |
| 2013/0046894 A1 | 2/2013 | Said et al. |
| 2013/0086097 A1 | 4/2013 | Teichmann et al. |
| 2013/0086174 A1 | 4/2013 | Brunswig et al. |
| 2013/0086547 A1 | 4/2013 | Said et al. |
| 2013/0097585 A1 | 4/2013 | Jentsch et al. |
| 2013/0111427 A1 | 5/2013 | Brunswig et al. |
| 2013/0125053 A1 | 5/2013 | Brunswig et al. |
| 2013/0145371 A1 | 6/2013 | Brunswig et al. |
| 2013/0159034 A1 | 6/2013 | Herter et al. |
| 2013/0159035 A1 | 6/2013 | Brunswig et al. |
| 2013/0166472 A1 | 6/2013 | Brunswig et al. |
| 2013/0166602 A1 | 6/2013 | Brunswig et al. |
| 2013/0166603 A1 | 6/2013 | Said et al. |
| 2013/0166675 A1 | 6/2013 | Giebel et al. |
| 2013/0173549 A1 | 7/2013 | Brunswig et al. |
| 2013/0174181 A1 | 7/2013 | Jentsch et al. |
| 2013/0311839 A1 | 11/2013 | Brunswig et al. |
| 2013/0311877 A1 | 11/2013 | Ebner |
| 2013/0326470 A1 | 12/2013 | Jentsch et al. |
| 2014/0006000 A1 | 1/2014 | Said et al. |
| 2014/0006084 A1 | 1/2014 | Schmidt et al. |
| 2014/0006089 A1 | 1/2014 | Penning et al. |
| 2014/0006232 A1 | 1/2014 | Viehweger et al. |
| 2014/0039968 A1 | 2/2014 | Said et al. |
| 2014/0040177 A1 | 2/2014 | Sherman et al. |
| 2014/0068021 A1 | 3/2014 | Arseniev et al. |
| 2014/0122144 A1 | 5/2014 | Cirpus et al. |
| 2014/0122436 A1 | 5/2014 | Brunswig et al. |
| 2014/0123020 A1 | 5/2014 | Bleier et al. |
| 2014/0136668 A1 | 5/2014 | Brunswig et al. |
| 2014/0137075 A1 | 5/2014 | Said et al. |
| 2014/0156726 A1 | 6/2014 | Bohlmann et al. |
| 2014/0157154 A1 | 6/2014 | Brunswig et al. |
| 2014/0165150 A1 | 6/2014 | Brunswig et al. |
| 2014/0172409 A1 | 6/2014 | Brunswig et al. |
| 2014/0173451 A1* | 6/2014 | Klaka .............. G06Q 50/01 715/744 |
| 2014/0181004 A1 | 6/2014 | Said et al. |
| 2014/0195908 A1 | 7/2014 | Brunswig et al. |
| 2014/0222914 A1 | 8/2014 | Ebner et al. |
| 2014/0282024 A1 | 9/2014 | Ebner et al. |
| 2014/0282880 A1 | 9/2014 | Herter et al. |
| 2014/0359575 A1 | 12/2014 | Brunswig et al. |
| 2014/0366002 A1 | 12/2014 | Jentsch et al. |
| 2014/0372550 A1 | 12/2014 | Said et al. |
| 2015/0088897 A1 | 3/2015 | Sherman et al. |
| 2015/0095767 A1 | 4/2015 | Ebner et al. |
| 2015/0095840 A1 | 4/2015 | Soshin et al. |
| 2015/0100946 A1 | 4/2015 | Brunswig et al. |
| 2015/0112752 A1 | 4/2015 | Wagner et al. |
| 2015/0113093 A1 | 4/2015 | Brunswig et al. |
| 2015/0169675 A1 | 6/2015 | Said et al. |
| 2015/0341282 A1 | 11/2015 | Bar-On et al. |
| 2016/0092810 A1 | 3/2016 | Chatterjee et al. |
| 2016/0098425 A1 | 4/2016 | Brunswig et al. |
| 2016/0100025 A1 | 4/2016 | Ebner et al. |
| 2016/0110670 A1 | 4/2016 | Chatterjee et al. |
| 2016/0162263 A1 | 6/2016 | Brunswig |
| 2016/0188546 A1 | 6/2016 | Gavriel et al. |
| 2016/0328137 A1 | 11/2016 | Brunswig et al. |
| 2017/0200018 A1* | 7/2017 | Boncha ............ G06F 21/6218 |

OTHER PUBLICATIONS

Chinnabathini, Joseph. "SAP Fiori 2.0—Next generation business software," SAP Community Blogs, SAP, Sep. 26, 2015, https://blogs.sap.com/2015/09/26/sap-fiori-20-next-generation-business-software/ (accessed at least as early as Jul. 20, 2016.).

(56) References Cited

OTHER PUBLICATIONS

Falk, Michael, "SAP Fiori 2.0," May 2016. www.asug.com/discussions/servlet/JiveServlet/downloadBody/44447-102-2-66423/FFiori/5202.0_for_ASUG/520-/5204038.pdf (accessed at least as early as Jul. 20, 2016.).

Heilman, Rich. "Introduction to SAP HANA SQLScript." ASUG Annual Conference, May 5-7, 2015. http://docplayer.net/7800782-Introduction-to-sap-hana-sqlscript-rich-heilman-session-code-bt162.html (accessed at least as early as Jul. 28, 2016).

Reddy, Srinivas. "SAP HANA SQLScript Reference." Aug. 21, 2015. http://www.academia.edu/18496829/SAP_HANA_SQLScript_Reference (accessed at least as early as Jul. 28, 2016.).

SAP AG, "Configuring a Shell Plugin App." SAP HANA Cloud Documentation. https://help.hana.ondemand.com/cloud_portal_flp/frameset.htm?87764543e31247b5b471c06e3f6da6fc.html (accessed at least as early as Jul. 28, 2016.).

SAP AG, "SAP Fiori Road Map," Dec. 1, 2015. https://www.scribd.com/document/313567545/Fiori-Roadmap-2015-December (accessed at least as early as Jul. 20, 2016.).

SAP AG, "SAP HANA® Database for Next-Generation Business Applications and Real-Time Analytics." Dec. 5, 2012. http://www.ndm.net/datawarehouse/pdf/SAP-HANA-Database.pdf (accessed at least as early as Jul. 28, 2016.).

SAP AG, "SAP User Experience Strategy", Jun. 2016. https://experience.sap.com/documents/sap-ux-strategy.pdf (accessed at least as early as Dec. 5, 2016).

SAP AG, "UI Annotations," http://help.sap.com/saphelp_nw75/helpdata/en/f8/af07bb0770414bb38a25cae29a12e9/content.htm (accessed at least as early as Oct. 17, 2016.).

SAP AG, "UX106—SAP Fiori Launchpad: Overview and Recommendations," Nov. 2015. http://www.abapstudio.com/blog/wp-content/uploads/2015/11/2015_ASUG_UX106%E2%80%93SAPFioriLaunchpadOverviewandRecommendations.pdf (accessed at least as early as Jul. 20, 2016.).

Wolf, Gregor, "How powerful if #SAP #Fiori #Co-Pilot brings in #Google #allo features. #SAPPHIRENOW #io16." May 18, 2016, 1:18 PM. https://twitter.com/wolf gregor/status/733028959370252288 (accessed at least as early as Jul. 20, 2016.).

* cited by examiner

DYNAMIC WORKFLOW ASSISTANT WITH SHARED APPLICATION CONTEXT

CROSS REFERENCE TO RELATED APPLICATIONS

This application is a continuation-in-part of U.S. patent application Ser. No. 14/981,917, filed Dec. 29, 2015, and this application claims the benefit of U.S. Provisional Patent Application No. 62/336,100, filed May 13, 2016, all of which are hereby incorporated herein by reference.

BACKGROUND

Individuals are increasingly called upon to track large amounts of complex information, and to handle multiple tasks at one time. It can be difficult for users to organize their workflow to help them efficiently accomplish their tasks. While notes and task lists have been used to try and manage an individual's workload, they can suffer from disadvantages, such as requiring the user to switch their focus. Notes and task lists can also require a user to transcribe information, which can be time consuming, and can be impractical as the amount of data and number of tasks increase. In addition, while notes and task lists may provide some benefit for a single user, they can be difficult to adapt to collaborative projects involving more than one individual.

The electronic equivalent of notes and task lists typically suffer from similar drawbacks. In order to enter a note or a task, a user often will have to switch from one software application to another, which can interrupt their workflow and thought process, and be inefficient. In addition, the user must typically manually transfer data to the note or task list. Even cutting and pasting, this process can be tedious and time consuming. Additionally, collaboration with other users can still be difficult.

Accordingly, there remains room for improvement.

SUMMARY

The Summary is provided to introduce a selection of concepts in a simplified form that are further described below in the Detailed Description. The Summary is not intended to identify key features or essential features of the claimed subject matter, nor is it intended to be used to limit the scope of the claimed subject matter.

An embodiment can be implemented as one or more computer-readable media comprising computer-executable instructions that when executed cause a computing system to perform processing to provide a workflow assistant with context information from a base application. The processing includes rendering a base display of the base application. The base display is associated with at least one context item. The at least one context item is retrieved with a workflow assistant. The at least one context item is associated with at least one assistant item. A workflow assistant display is rendered that includes, or is based at least in part on, the at least one context item.

An embodiment can be implemented as a system comprising memory; one or more hardware processors coupled to the memory; and one or more computer-readable media storing instructions that, when loaded into the memory, cause the one or more hardware processors to perform operations, including receiving a request for a data element, data object, assistant item, or collection. The operations further include retrieving the data element, data object, assistant item, or collection. Annotations are retrieved that are associated with the retrieved data element, data object, assistant item, or collection. The retrieved annotations are associated with the retrieved data element, data object, assistant item, or collection. The annotated data element, data object, assistant item, or collection is displayed.

An embodiment can be implemented as a method implemented at least in part by a computing system, the method includes retrieving or generating one or more data objects or data elements with a base application. The one or more data objects or data elements are identified with a context analyzer. At least one of the one or more data objects or data elements is retrieved from the context analyzer by a workflow assistant. An assistant item is created that includes the at least one of the one or more data objects or data elements.

As described herein, a variety of other features and advantages can be incorporated into the technologies as desired.

DETAILED DESCRIPTION

Example 1—Example Overview

Figure 1:
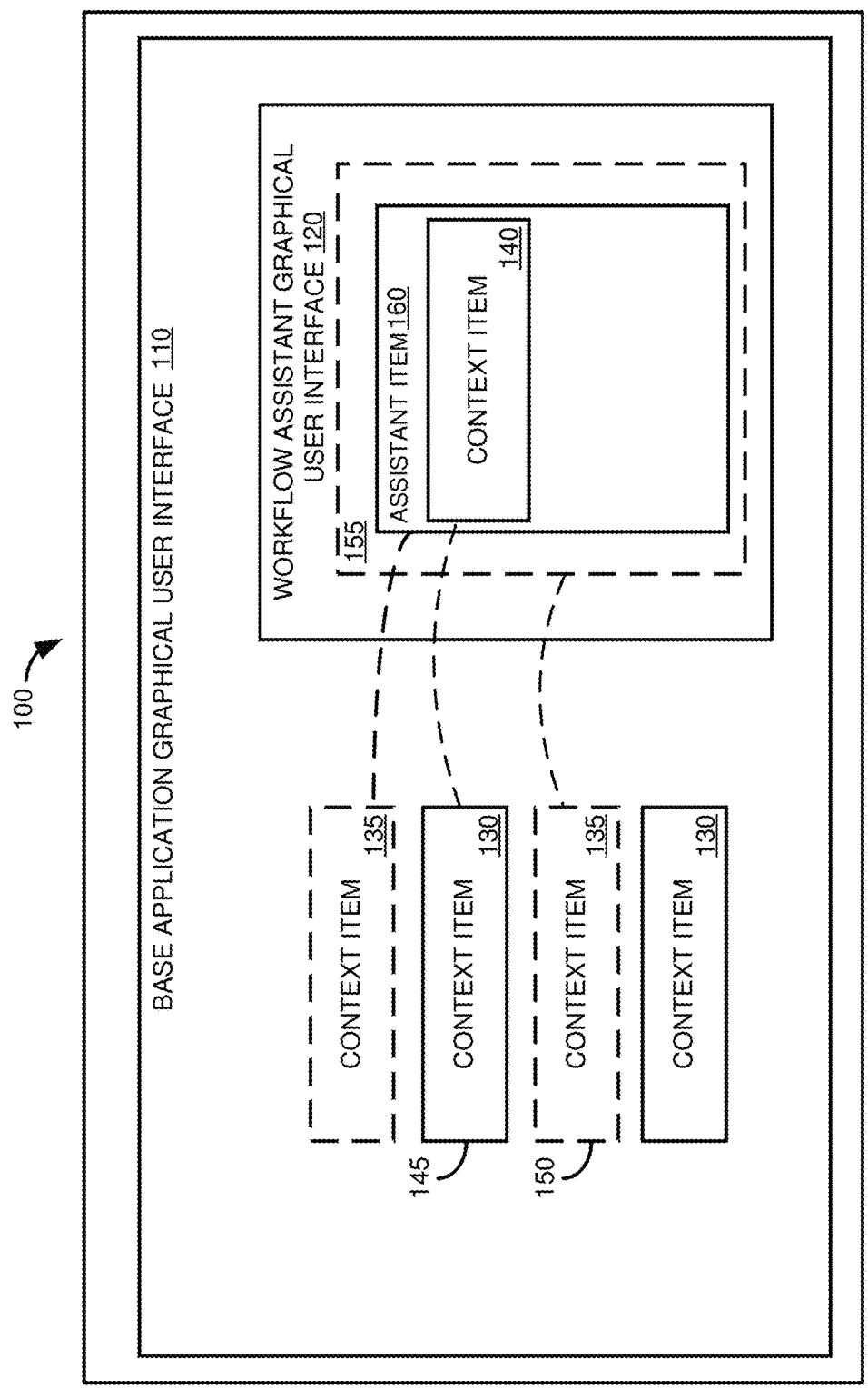
FIG. 1 is a block diagram of an example screen having a graphical user interface for a base application and a graphical user interface for a workflow assistant.

Technology can make increasing amounts of information available. This information can be used in a variety of ways by individuals performing any number of tasks. Individuals are also increasingly called upon to synthesize information from numerous sources, and to perform and track multiple tasks simultaneously. The volume of information and tasks that need to be tracked and carried out, including being carried out at an increasing pace, can quickly become overwhelming.

In the analog world, individuals have used notes, task lists, and similar aids to help them keep track of their workflow, including what tasks they need to perform, as well as to help them track and remember key pieces of information. In addition, there have been attempts to facilitate information tracking using computing devices. For example, users have access to the digital equivalent of notes, tasks lists, and calendars.

However, both analog tracking aids, and prior computer-implemented tracking aids, can suffer from a number of disadvantages. For example, physical items, like notes, can become disorganized and misplaced. When a user wishes to remind themselves of a task or a key piece of information, they are typically required to interrupt their work flow in order to find the relevant note or other aid.

Computer-implemented tracking aids can suffer from similar problems as their analog counterparts. For example, if a user is working in a particular computing system that facilitates one or more tasks the individual must accomplish, such as a database system or a sales or accounting platform, and they wish to record or retrieve information related to their workflow or thought process, they often have to switch to a different application, which can interrupt their workflow. In addition, it may be time consuming to manually transfer information from one application to another. Tracking aids can also be difficult to use in collaborations involving multiple individuals.

In one aspect, the present disclosure provides an integrated workflow assistant that can be used with a base application in order to facilitate user tasks, workflow management, and the creation of memory aids. The workflow assistant, in particular examples, can facilitate the creation of structured content from unstructured content. For example, a collection of information related to a project a user is working on can be created. In some cases, the integrated workflow assistant can be displayed on the same display (e.g., screen) as at least one window of the base application. Thus, the user may be able to use the workflow assistant without having to leave, or switch from, the base application.

In further aspects, the workflow assistant can retrieve data from, or associated with, the base application. For instance, the workflow assistant can determine a context of the base application and suggest actions or data to be used by the user in the workflow assistant. A suggested action could be, for example, creating a new calendar item, contacting an individual, creating a new document, or filling out a form. Suggesting data to be used by the user may include suggesting values for particular fields of a document or form, or associating terms entered by the user with contextual information. For example, if a user enters a name into a note or chat item, the name may be recognized as associated with information maintained in a computing system, such as a profile, which can include contact information.

In some cases, rather than, or in addition to, recognizing information in user-entered data, the information can be recognized using a text analysis service. The workflow assistant can also provide for the creation or modification of collections, which can include one or more assistant items, along with other content, such as data objects or data elements.

The present disclosure can thus provide for a number of advantages. A workflow assistant can allow for the creation of collections containing assistant items, data objects, and data elements related to a theme of interest to a user. Sharing a context between the workflow assistant and one or more base applications can allow a user to maintain their thought process and workflow by providing an integrated working environment. The sharing can also allow information to be transferred to the workflow assistant from the base application without requiring user interaction, which can increase efficiency. Dynamic interaction of the workflow assistant and base application can also allow the workflow assistant to adapt to the user's actions, including suggesting actions that may be helpful to the user.

Example 2—Example Base Application and Integrated Workflow Assistant

FIG. 1 is a schematic diagram of an example user display 100 that can be used to present a base application and an integrated workflow assistant. The display 100 can include a graphical user interface 110, which can provide a display for the base application. The display 100 can also include a graphical user interface 120 for the integrated workflow assistant.

The display 100 can be associated with one or more context items 130, 135. Some context items, context items 130, can be displayed on the graphical user interface 110. Other context items, context items 135, can be associated with a screen displayed on the graphical user interface 110, but need not be displayed to the user. Context items 135 can, for example, represent information about the display or functionality of the base application. In some aspects, a context item can transition between being a context item 130 displayed to a user and a context item 135 not displayed to a user. For example, the transition may occur in response to user input received through the graphical user interface 110.

The context items 130, 135 can be used in a display provided by the graphical user interface 120. In some cases, the context items 130, 135, such as context item 140, corresponding to, or associated with, a context item, 145, can be displayed in the graphical user interface 120. In other cases, one or more of the context items 130, 135 can be used to determine the format or content of all or a portion of the content displayed in the graphical user interface 120. A context element 150 may be used to suggest the format of a window 155 of the graphical user interface 120.

For example, if the context item 150 indicates that the graphical user interface 110 is displaying a screen related to a business account, the context item may be used to cause the graphical user interface 120 to display a form to create a new sales order for the associated account. Context element 140 may represent, for example, the name of the company associated with the account, and can be displayed in the graphical user interface 120.

The context items 130, 135 may also be used to provide information to be used with assistant items 160 associated with the graphical user interface 120. In at least some cases, the assistant items 160 can provide structure for unstructured content, such as the context items 130, 135. For example, if a context item 130, 135 represents a product, in isolation, that information may not have particular significance. However, if the user indicates that the product is associated with a sales quote, some context or structure has been provided. In various examples, an assistant item 160 can be a document, a note, a chat, a form, a data object (such as a structured or unstructured collection of data elements), or a screen capture/screenshot. In some aspects, an assistant item 160 can be a collection of one or more other assistant items, data elements, data objects, or combinations thereof.

The workflow assistant item can be represented by a data element, such as an identifier, or a data structure, such as a collection of data elements. An identifier can be used to associate the workflow assistant item with other information, such as a collection (e.g., a parent ID), other workflow assistant items (e.g., a child ID), data objects, data elements, or a combination thereof. The workflow assistant item can include metadata associated with a user who created the item, or users who are allowed to access or modify the item, as well as the time and date of item creation. A data element of the workflow assistant item can be associated with a type of the assistant item (e.g., form, note, chat). Data elements can also be used to describe the workflow assistant item (such as a title) or indicate its status (such as open or completed).

In particular examples, as assistant item 160 may represent a note or chat message entered into the graphical user interface 120 by a user. The note or chat message may include a name of a company, an individual, a product, etc. that has some association with a context item 130, 135. If the assistant item 160 is analyzed, the analysis may be influenced by one or more of the context items 130, 135. As an example, if the assistant item 160 is a note, and the note is analyzed and determined to contain a name, one or more of the context items 130, 135 can be used to associate the assistant item 160 with additional information. It may be ambiguous who a name refers to, as several individuals may have the same name. The context items 130, 135 can be used to try and determine a specific individual to which the name refers, and optionally display, or make available, additional information regarding the intended individual.

The display 100 can provide a number of advantages. For example, by displaying the graphical user interfaces 110, 120 simultaneously, and allowing a user to interact with the graphical user interfaces concurrently, a user can create structured content, such as for use as a memory or workflow aid, without having to interrupt their workflow or thought process. In addition, because the workflow assistant can access context items 130, 135, the workflow assistant can anticipate what actions a user may wish to take and present the user with an appropriate display on the graphical user interface 120. In addition, relevant context items 130, 135 can automatically be incorporated into, or suggested for incorporation into, an application item 160. Thus, the workflow assistant can speed, or otherwise facilitate, the creation of structured content.

Example 3—Example Association of Context Item with Assistant Item

Figure 2:
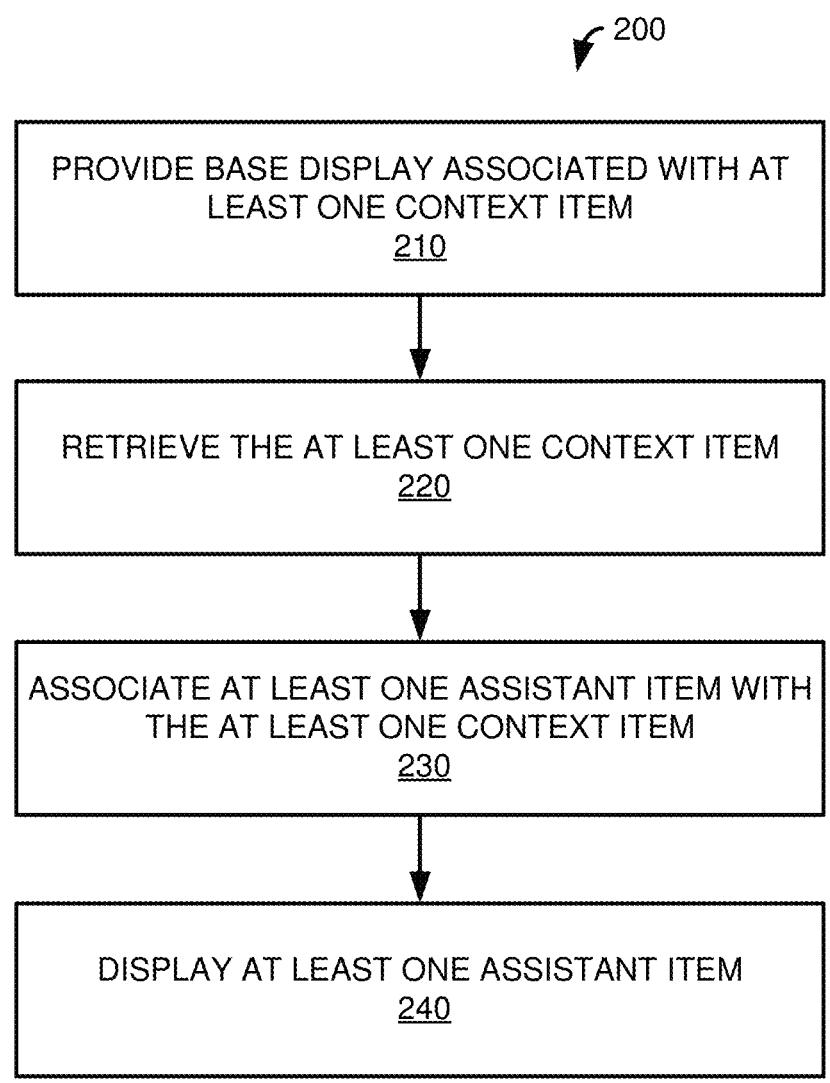
FIG. 2 is a flowchart of an example method of sharing context information between a base application and a workflow assistant according to an embodiment of the present disclosure.

FIG. 2 is a flowchart of a method 200 that can be used to associate a context item, such as context item 130, 135 of FIG. 1, with or more assistant items, such as the assistant item 160.

At 210, a base display is provided that is associated with at least one context item. The at least one context item can be, or can include, for example, information displayed on the base display. In some cases a context item can be information displayed, or directly associated with, the base display. In other cases, a context item can be information obtained indirectly from another context item displayed on, or directly associated with, the base display. For example, a data object associated with a context item may itself be a context item. Or, a data object may be associated with a first context item, and another category or piece of information associated with the data object may be identified as a second context item, even if the second context item is not displayed on the base display or being directly used in association with the base display.

Information displayed on the base display can include all or a portion of information associated with a data object. A data object can be a collection of related data elements. For example, a data object for a person might include information (data elements) such as the person's name, address, title, social security number or other identifier, email address, phone number, birthday, and the like.

The data object can also include information that more particularly relates to a software application associated with the base display. That is, if the software application relates to sales, the information regarding the person, and associated with the data object, may include prior purchases of the individual, which can then be associated with particular products purchased, invoices, and the like.

The at least one context item can be retrieved at 220. For example, the at least one context item can be retrieved by the workflow assistant. Or, the at least one context item can be retrieved by a component in communication with the workflow assistant and then provided to the workflow assistant.

At 230, at least one assistant item of the workflow assistant can be associated with the at least one context item. In some cases the at least one assistant item can be an application entity, such as a note, chat, data collection, screenshot, document, form, or the like. In other cases, the at least one assistant item can be a data element, such as a name, account number, product identifier, or the like, or a data object that includes a plurality of data elements. In some aspects, a workflow assistant item can be associated with a context item by being linked or otherwise navigationally associated with the context item, such as when text of a note or chat provides information regarding the context item when selected. In further aspects, a workflow assistant item can be associated with a context item by incorporating all or a portion of the information of the context item, such as when a data object context item is included in a document or form.

The at least one assistant item can be displayed, such as on the graphical user interface 120 of FIG. 1, at 240. Displaying the at least one assistant item can include, for example, displaying a form to a user, where the form was determined at least in part based on the at least one context item. Or, displaying the assistant item can including displaying a data object or data element associated with the assistant item.

Example 4—Example Workflow Assistant Collections and Actions

Figure 3:
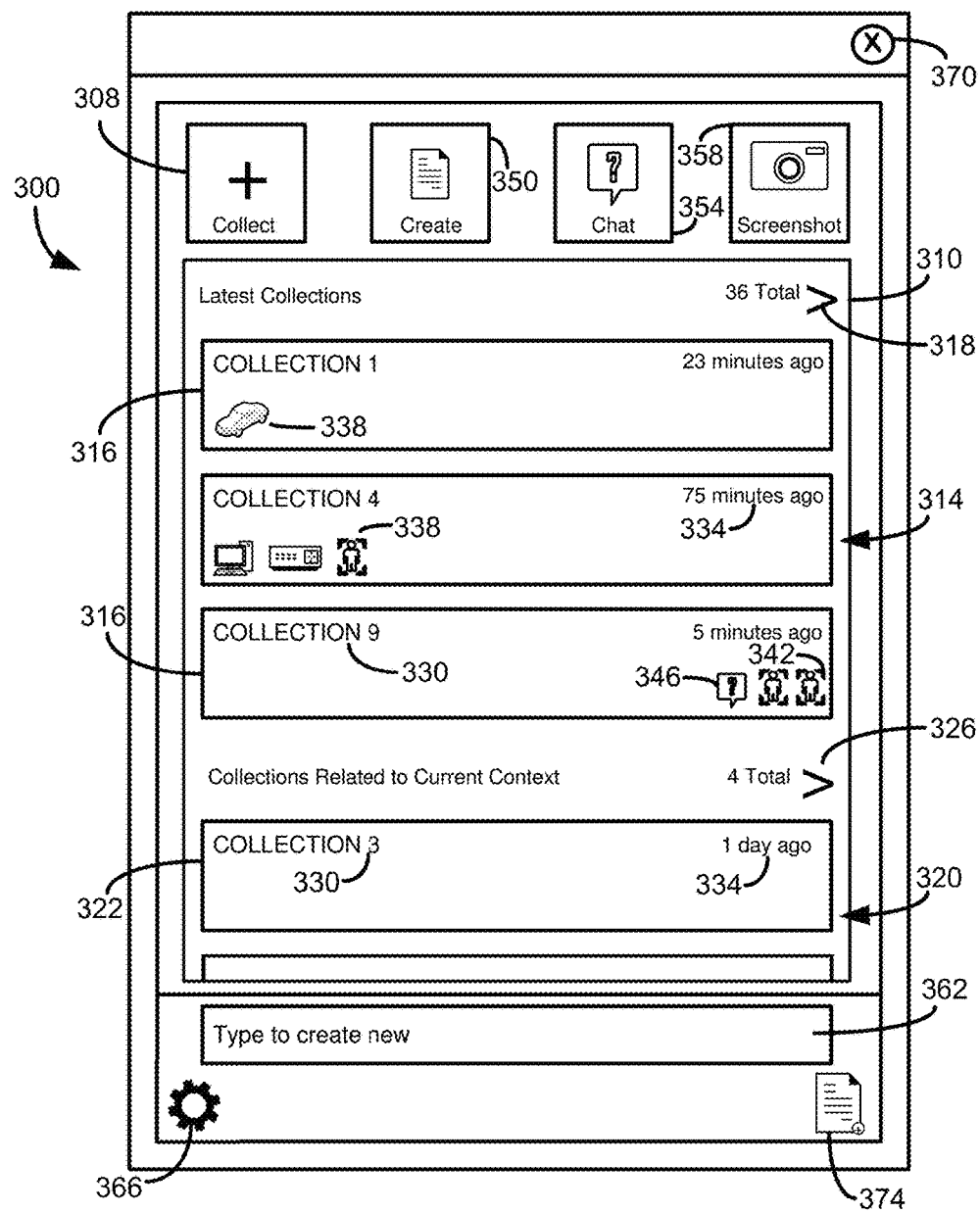
FIG. 3 is an example workflow assistant screen illustrating a plurality of collections.

FIG. 3 is a diagram of an example screen 300 that can be provided by a workflow assistant, such as on the graphical user interface 120 of FIG. 1. The example screen 300 can be used to display information to a user regarding context items, assistant items, and other information. The example screen 300 can also present a user with options that may be taken regarding the displayed information, or to create or access other information.

One action that can be provided to a user is to create or edit a collection of context items, assistant items, data objects, data elements, or combinations thereof. For example, the user can select an "add collection" icon 308 to create a new collection. The collection may represent a structured collection of information, such as information related to a common theme. In some cases, the theme may be selected from one or more predetermined themes provided by the workflow assistant. In other cases, the theme may be determined by a user. In at least some cases, a theme does not require any particular relation, or degree of relation, between items in the collection. That is, a collection can provide a way for a user to organize information in a way that may allow a user to better track, access, and maintain the information. So long as the objects in the collection serve that user goal, the objects can be considered thematically related.

The screen 300 can include a collections window 310. The collections window 310 can display at least a portion of collections associated with a particular user. A portion 314 of the window 310 can display collections chronologically. For example, the portion 314 may display the most recently created or edited collections 316. By selecting an icon 318, a user may be taken to a view which displays all of the collections with which the user is associated.

Another portion 320 of the collections window 310 can display collections 322 associated with a particular context. For example, the context may be a context (e.g., screen or functionality) determined from, or associated with, the display presented on the graphical user interface 110. As the user interacts with a base application, the context can change, which in turn can change the collections displayed in the portion 320. As with the portion 314, in some cases the number of collections 322 potentially associated with the portion 320 can exceed a number that can be displayed in the portion 320. An icon 326 can be provided which can be selected by a user to navigate to a display that lists all of the collections 322 associated with the current context.

Various information relating the collections 316, 322 can be displayed in the collections window 310. For example, each collection 316, 322 can be associated with a name, title, or similar identifier 330. A timestamp 334 can indicate when the collection 316, 322 was created, last accessed, or last modified. The collections window 310 can also provide a summary or other indication of information in a collection. For example, icons 338 may be provided, representing the nature or identity of data objects, data elements, context items, application items, or other information maintained in a collection 316, 322.

In at least some cases, one or more of the collections 316, 322 can be shared or accessed by multiple users. For example, a collection 316, 322 may be created for a collaboration between two or more users. The collections window 310 can display icons (such as photographs or other identifiers) 342 for other users associated with a collection 316, 322. A collaboration regarding a collection 316, 322 can, in some cases, include a discussion or chat. A chat icon 346 can be provided to allow a user to create or access the chat or other discussion.

The screen 300 can provide for other actions to be taken by a user. A create icon 350 can be provided to allow a user to create a new data object, context item, assistant item, document, form, database entry, or similar action. A chat icon 354 can allow a user to communicate with other individuals. A screenshot icon 358 can allow a user to record an image of a display, such all or a portion of the content of a base application associated with the graphical user interface 110 of FIG. 1. In at least some cases, the screenshot so obtained can be associated with a collection.

In some cases, a user may be able to create new data objects, data elements, or assistant items by entering text in a field 362. In particular cases, a computing system can attempt to parse the text, such as to suggest a format for the text. In particular, the text may be parsed to see if it can be associated with any collections, data objects, data elements, context items, or assistant items.

An icon 366 can allow a user to edit settings associated with the workflow assistant, while an icon 370 can allow a user to close or minimize the workflow assistant, such as on the display 100. An icon 374 can allow a user to create a new, empty collection.

Figure 4:
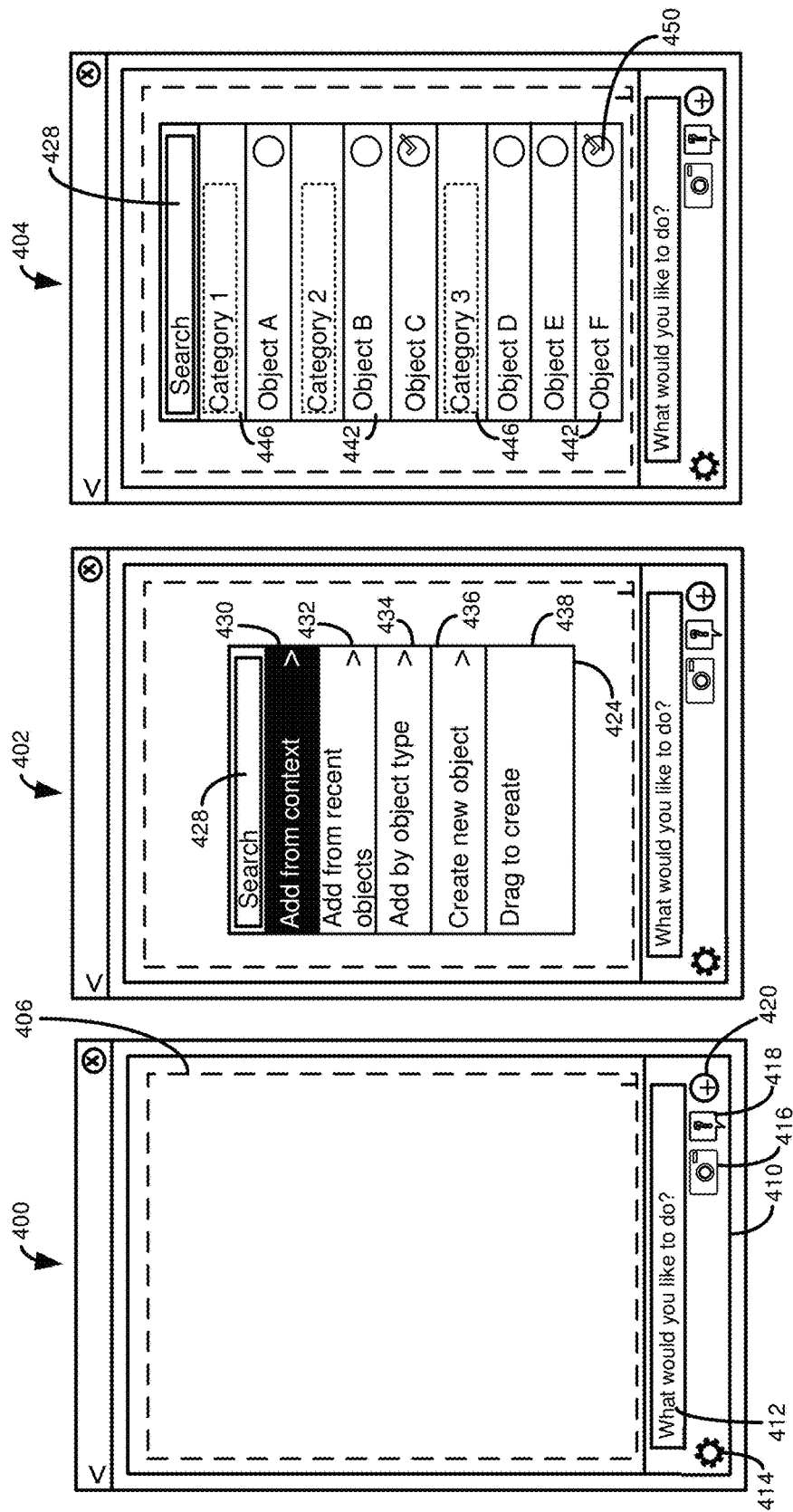
FIG. 4 is example workflow assistant screens depicting user-selection of data objects retrieved by the workflow assistant from a base application.

FIG. 4 is a diagram of example screens 400, 402, 404 that can be provided by a workflow assistant, such as on the graphical user interface 120 of FIG. 1. The screens 400, 402, 404 demonstrate how a user can create data objects, context items, assistant items and the like using context information from a base application.

Example screen 400 presents a display window 406 that can have varying content including, in some cases, the collections window 310 of FIG. 3. A display panel 410 can provide various options to a user, including to create items, or take other actions, using a text entry field 412, edit settings of the workflow assistant using icon 414, take a snapshot of all or a portion of a display associated with a base application by selecting snapshot icon 416, or chatting or otherwise communicating with other users by selecting a chat icon 418. An add icon 420 can allow a user to create new information or associations, including using context information associated with a base application.

Screen 402 illustrates a display that may be presented to a user after the add icon 420 is selected. A window 424 can provide a user with various options to add or create new information or associations. A user can choose to search for information to add by entering text in search field 428. By selecting display element 430, a user can choose to add information associated with the context of the base application.

Other options may be provided for adding new information. For example, a display element 432 can allow a user to select objects (such as for addition to a collection) or other information items that have been recently used (such as by the user, or, in a collaborative setting, by another user associated a particular collaboration). A display element 434 can allow a user to add a new object (such as to a collection) by object type. The object type can be, in some examples, an individual or company, such a by the role of the individual or company (e.g., buyer, seller, sales lead), a document type (e.g., a purchase order, quote, sales lead, sales opportunity, contract, invoice), or another type of object, such as information related to a product or a material used in the provision of goods or services. In some cases, the display element 434 can be used to select existing objects, and a display element 436 can allow a user to create a new object (such as to be added to a collection).

As described herein, a base application and a workflow assistant can communicate and interact with one another. Accordingly, in at least some aspects, a user can associate information from the base application with the workflow assistant (e.g. an assistant item or collection), such as by dragging information (such as represented by text, an icon, or other visual element) from the base application into a drag and drop field 438 of the workflow assistant.

Screen 404 illustrates a display that may be presented to a user after the add from context display element 430 is selected. The screen 404 can provide the search field 428, as well as various context items 442 (which can be data objects) associated with the base application. The context items 442 can be separated into categories 446. Selector icons 450 can be provided to allow a user to select particular context items 442 for further processing, such as for use in creating a new assistant item or adding them to an existing assistant item or collection.

Figure 5:
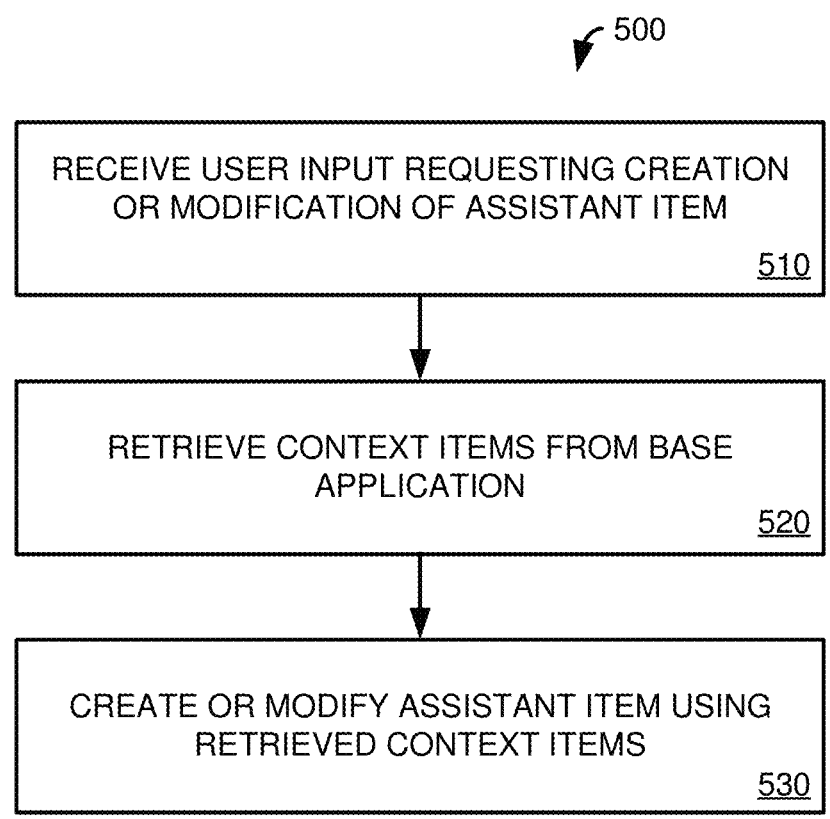
FIG. 5 is a flowchart of an example method of creating or modifying an assistant item using context elements retrieved from a base application according to an embodiment of the present disclosure.

Example 5—Example Creation or Modification of Assistant Item Using Context Information FIG. 5 is a flowchart illustrating a method 500 for creating or modifying an assistant item using context items associated with a base application. At 510, user input is received requesting the creation or modification of an assistant item. Context items from the base application are retrieved by a workflow assistant at 520. At 530, the workflow assistant creates or modifies the assistant item using the retrieved context elements.

Figure 6:
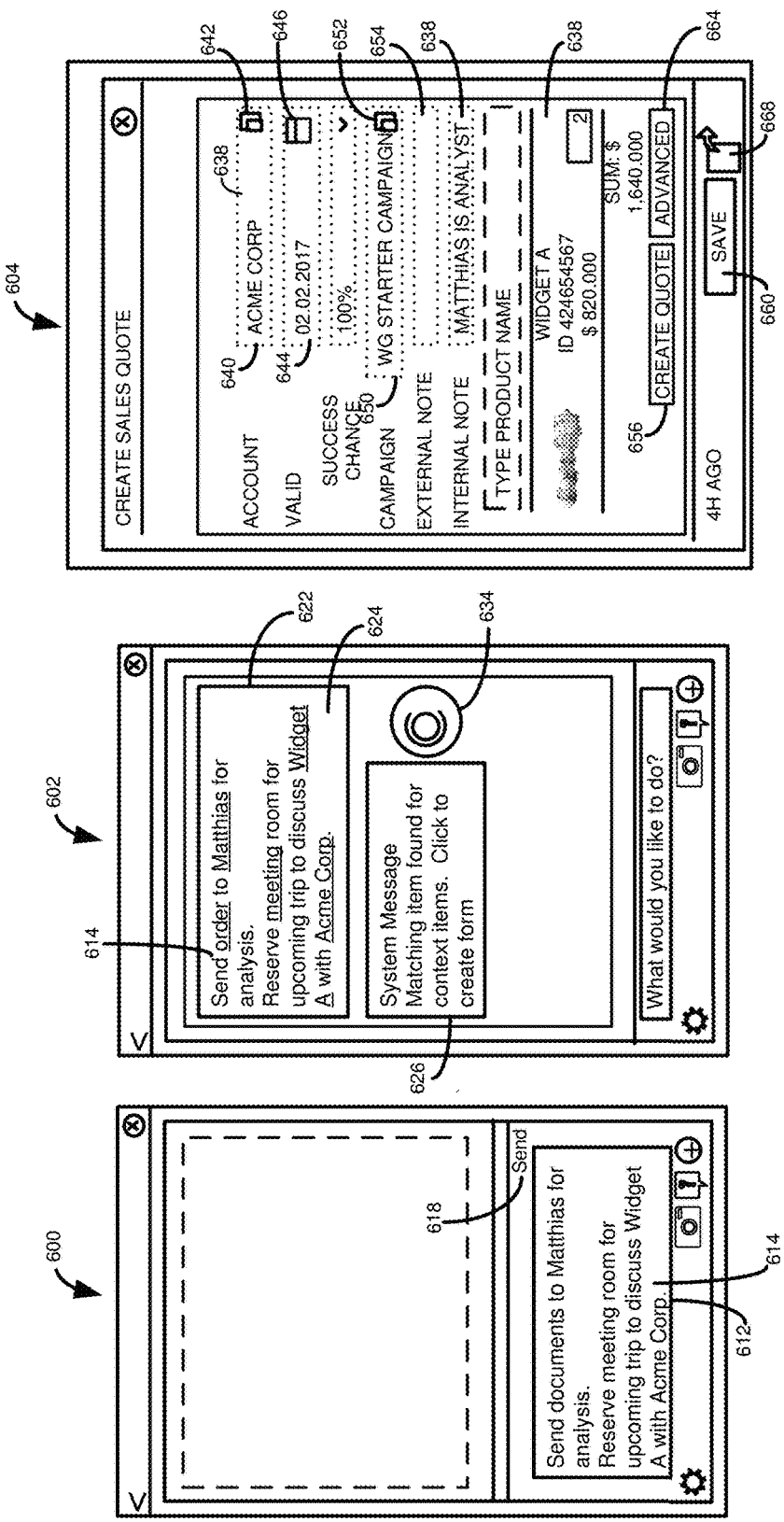
FIG. 6 is example workflow assistant screens depicting using text analysis of user input to generate an assistant item.

Example 6—Example Displays for Assistant Item Creation from User Textual Input FIG. 6 is a diagram of example screens 600, 602, 604 illustrating extraction of data elements or data objects from user input, and the use of the data elements or data objects in generating an assistant item. The screen 600 can be at least generally similar to the screen 400, including presenting a text entry field 612. The text entry field 612 is shown as containing text 614 entered by a user. The text 614 can represent, for example, a note that the user wishes to record with the workflow assistant. The user can enter the text 614 into the workflow assistant for processing (e.g., for analysis or storage) by selecting a send icon 618.

Screen 602 represents a display that may be presented to a user after the user enters text 614 into the system by selecting the send icon 618. A display window 622 displays the text 614 entered by the user. In some cases, the text 614 can be added, such as in the form of a note assistant item, to a collection. As part of the processing of the text 614, the workflow assistant, or a component in communication with the workflow assistant, can parse the text, such as to associate text elements (e.g., words or phrases) with reference keywords. Reference keywords, in some cases, can represent data objects or data elements maintained in a computing system associated with the workflow assistant.

The screen 602 can provide a visual indication of any text elements of the text 614 that are, or may be, associated with a data object or a data element. For example, in screen 602, such text elements are shown as underlined. In some cases, selecting the underlined text may bring up information regarding the corresponding data object or data element for display on the screen 602, or the user may be taken to a new screen where such information can be presented to the user.

An analysis component of, or in communication with, the workflow assistant can also analyze the text 614 to try and predict actions a user may wish to take, or suggest actions that may be helpful to a user. For example, the occurrence of a particular data object or data element associated with the text 614, or a particular collection of such objects or elements, may often be associated with one, or more, subsequent actions, such as the creation of a new data object, assistant item, or collection. In a specific case, the occurrence of the name of a company, or the name of an individual associated with a company, in connection with other keywords (e.g., order, invoice, sale), the name of a product, other data objects or data elements, or combinations thereof, may indicate that a user may wish to generate a new sales quote, or that the user may wish to consider doing so.

In other aspects, a suggested action may be determined in another manner. For example, suggested actions can be determined from context items of the base application. Or, suggested actions can be determined from the contents of a collection. Combinations of these approaches may also be used in suggesting actions to a user.

For any such suggested actions, the display 602 can provide a suggestion window 626. The suggestion window 626 can alert the user that a suggested action was identified and, optionally, provide information regarding the criteria that were used to determine the suggested action or the nature of the suggested action. An action interface element 634 can be provided. By selecting the action interface element 634, the user can direct the workflow assistant to take the suggested action.

The screen 604 can show the user the result of taking the suggested action after selection of the action interface element 634, or guide the user in completing the suggested action. The screen 604 can includes fields 638 that can be populated with information from the text 614, context information of the base application, or data elements or data objects associated with a current assistant item or collection. In some cases, the fields 638, including default values for one or more fields, can be specified in a template.

Continuing the example above of a sales quote, the screen 604 can display an account field 640. The account field 640 is filled in with a keyword identified from the text 614 as the likely account for which a user may wish to create a sales quote, in this case, Acme Corp. An icon 642 can be provided to allow a user to select a different account.

A date field 644 can provide a date associated with a data object or data element. For example, in a sales quote, the date field 644 may represent a date after which the sales quote is no longer valid. Of course, the date field 644 may represent another value, particularly when the data object or data element is other than a sales quote. In some cases, the date field 644 can be populated based on the text 614 (such as if the text includes a date or other content from which a date can be determined or inferred) or through a context item, such as a context item associated with the text 614, a collection, or the background application. An icon 646 can be provided to allow a user to select a different date.

One or more of the fields 638 may be populated with default options associated with an assistant item being created. For example, "Campaign" field 650 is populated with "WG Starter Campaign." An icon 652 can be provided to allow a user to select another entry for field 650.

At least some fields, such as field 654, may be left empty. For example, the information needed for the field 654 may not be present in, or determinable from, the text 614, or context information associated with a collection, assistant item, data object, data element, or the base application.

The screen 604 can provide the user with the ability to take other actions regarding the assistant item being created or modified. For example, the assistant item can be instantiated by selecting a create icon 656. If the user wishes to save their information, but not create the assistant item, such as if the user wishes to finish entering information at a later time, the user can save the information in the screen 604 by selecting a save icon 660.

In some cases, the actions available in the window 604 may not be sufficient for the user's needs. For example, the window 604 may present basic or common actions or fields, and a user may wish to take actions less commonly used, or access less commonly used fields. The user can choose to access other options by selecting the advanced icon 664. Similarly, in some cases, a user may wish to create or modify the assistant item in the base application. By selecting an icon 668, the information from the screen 604 can be transferred to the base application, including determining an appropriate context (e.g., screen, application, or function) of the base application to be displayed or otherwise provided by the base application.

Figure 7:
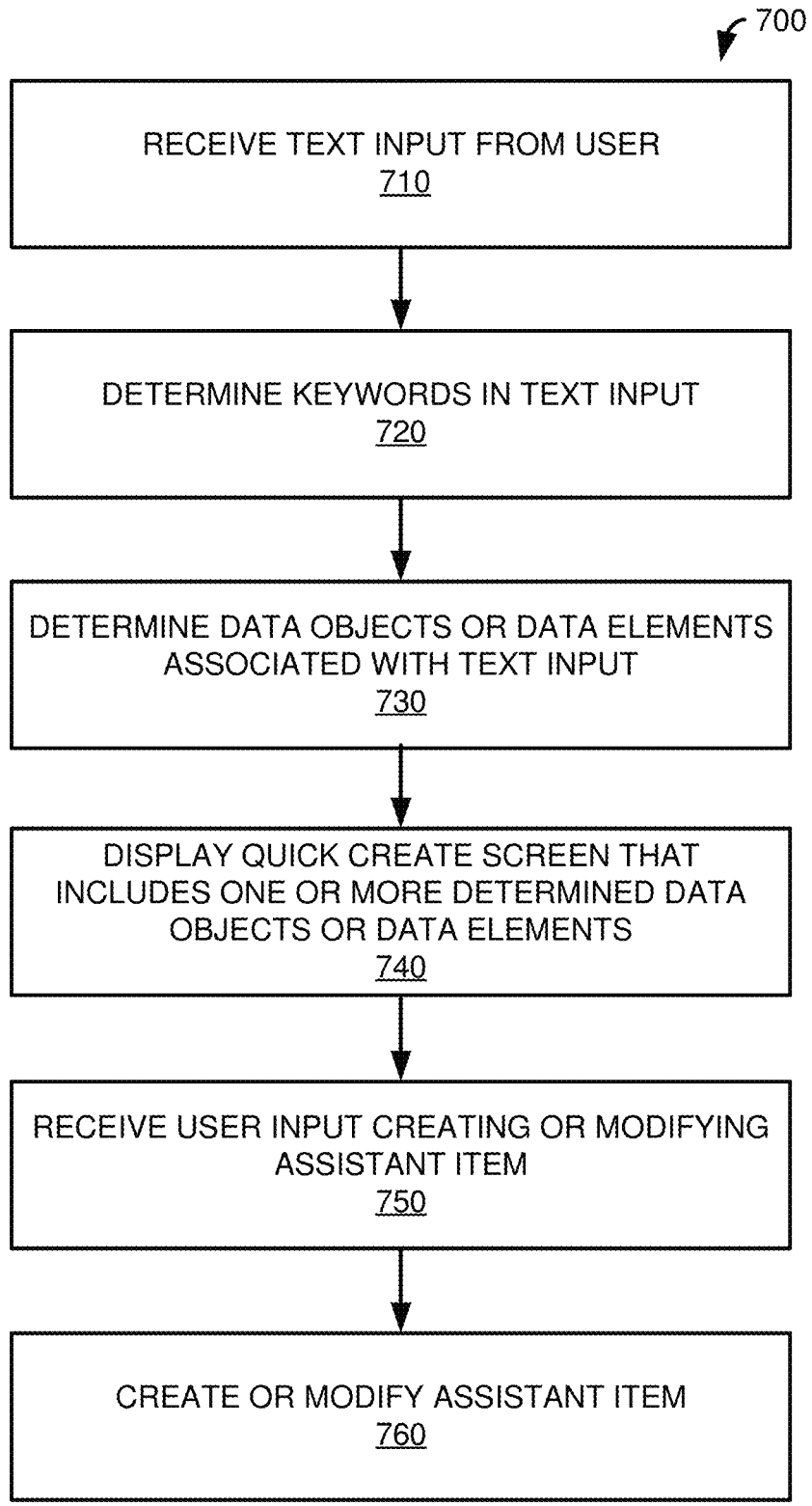
FIG. 7 is a flowchart of an example method of creating or modifying an assistant item using the results of text analysis of user input according to an embodiment of the present disclosure.

Example 7—Example Assistant Item Creation or Modification Using Data Elements Extracted from User Input FIG. 7 is a flowchart of an example method 700 for the creation or modification of an assistant item using data elements extracted from user input. At 710, text input is received from a user, the text input can include words, phrases, numbers, other types of textual input, or combinations thereof. Keywords in the text input are determined at 720. At 730, one or more data objects or data elements are determined from the text input. For example, the text may represent an identifier for the data object or data element. In other examples, the text may indirectly identify the data objects or data elements.

At 740, a quick create screen is displayed to a user. The quick create screen includes one or more of the data objects or data elements determined from the text input that can be added to a new assistant item or added to an existing assistant item to be modified. User input modifying or creating an assistant item including at least one of the one or more data objects or data elements is received at 750. The assistant item including the at least one of the one or more data objects or data elements is created or modified at 760.

Example 8—Example Software Architecture

Figure 8A:
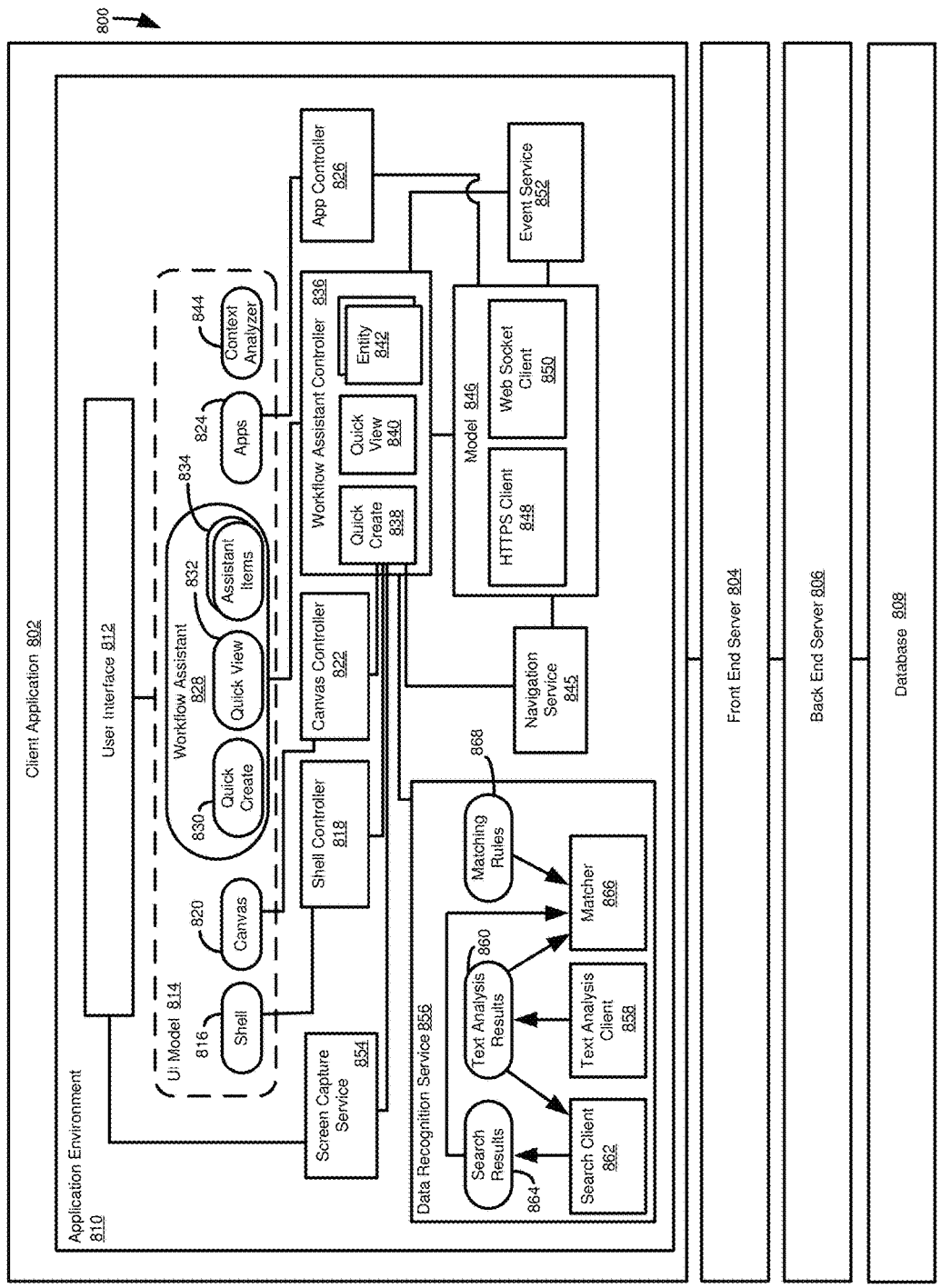
FIGS. 8A and 8B provide a block diagram of an example software architecture for implementing innovations of the present disclosure.
Figure 8B:
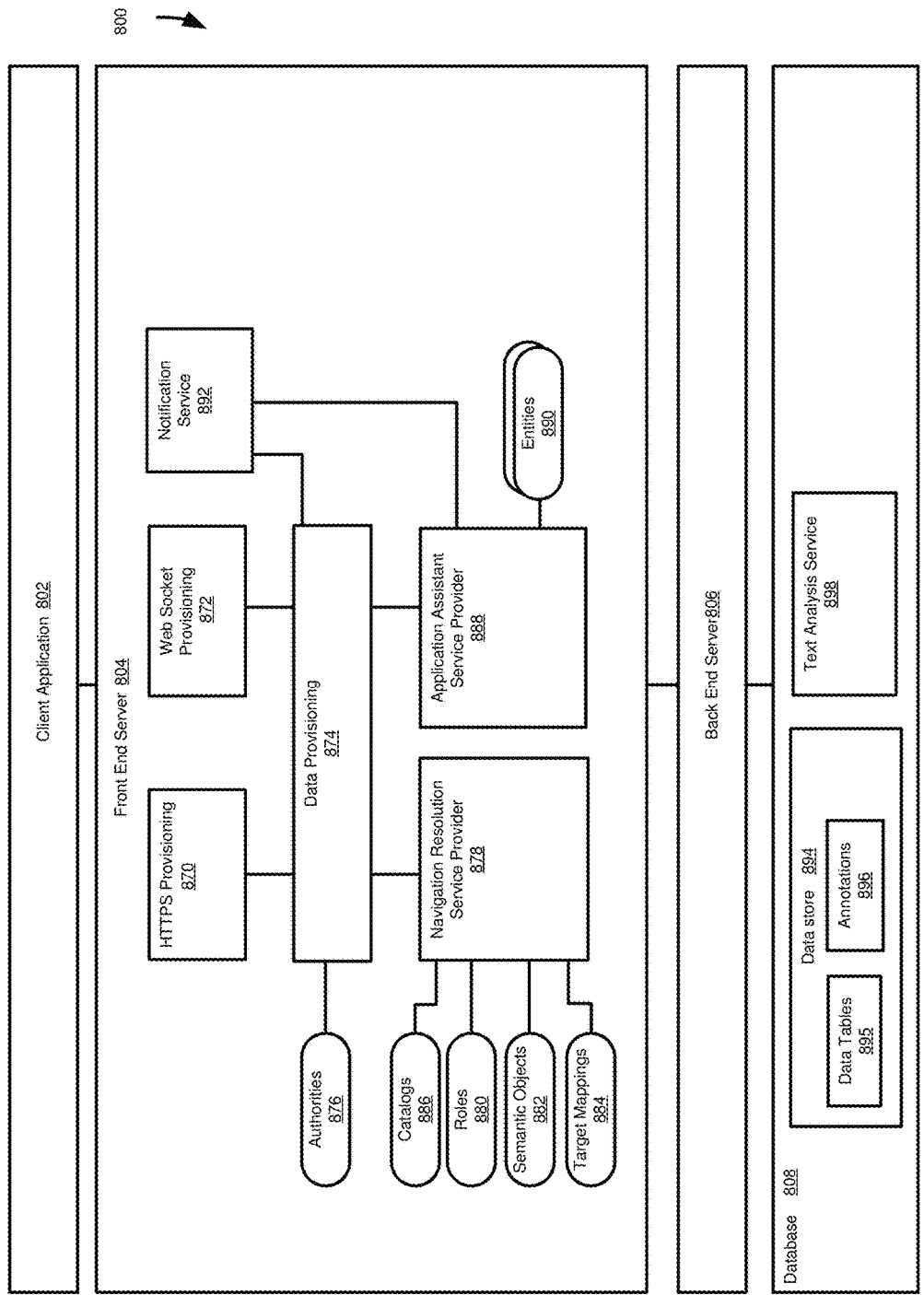

FIGS. 8A and 8B are block diagrams of an example software architecture 800 configured to provide the functionality described in one or more of Examples 1-7. Generally, the architecture includes a client application 802, a front end server 804, a back end server 806, and a database 808.

The client application 802, in some examples, can be a web browser. An application environment 810 can run in the client application 802. In particular examples, the application environment 810 can be the FIORI LAUNCHPAD of SAP SE of Walldorf, Germany. The application environment 810 can include a user interface 812, which, in some cases, can be a SAPUI5 interface of SAP SE, of Walldorf, Del. The user interface 812 can communicate with a user interface model 814 that can include a number of components. For example, the user interface model 814 can include a shell 816 which, in cooperation with a shell controller 818, can process user commands. A canvas 820, in cooperation with a canvas controller 822, can manage a display space for the application environment 810.

The user interface model 814 can include one or more base applications 824. For example, a base application 824 can be an app for the FIORI platform of SAP SE, of Walldorf Germany. The applications 824 may communicate with other software components, such as the S/4 HANA, S/4 HANA CLOUD, ERP, ERP7, ERP8, or SIMPLE FINANCE software components of SAP SE of Walldorf, Germany. The applications 824 may each be in communication with a corresponding application controller 826.

A workflow assistant 828 can be included in the user interface model 814 and can communicate with one or more of the base applications 824 through the application environment 810 and other components of the architecture 800. The workflow assistant 828 can provide various user interface features, including a quick create feature 830 that can be used to quickly create new assistant items or data objects. A quick view feature 832 can allow a user to quickly retrieve information regarding a data object or data element associated with an assistant item. The workflow assistant 828 can also include one or more assistant items 834. The workflow assistant 828 can be in communication with a workflow assistant controller 836, which can include a quick create controller 838, a quick view controller 840, and one or more entity controllers 842 for controlling the corresponding components of the workflow assistant 828.

A context analyzer 844 can carry out one or more of discovering, analyzing, and prioritizing data elements or data objects associated with the applications 824, as well as information regarding the application, such as the identity of the application and information associated with content being presented by, functionality provided by, or processed with, the application. For example, data objects associated with a current display of an application 824 can be recognized and prioritized in the event the data objects are to be used by the workflow assistant 828. Information gathered by the context analyzer can be accessed by the workflow assistant 828.

Prioritization can include making a determination of how likely the data object, data element, or other context information will be to a user action. Relevance can be determined by various measures, including how frequently the information has been accessed, how recently the information has been accessed, and how prominently the information is featured in the application 824. Fields of the application 824 can be associated with a priority. In at least some cases, all or a portion of the relevant context information provided by the context analyzer 844 can be associated with information used by the workflow assistant 828, including information associated with a collection or assistant item of the workflow assistant. The context information can be stored with the data objects, collections, or assistant items of the workflow assistant 828.

Information used in an application 824 or a workflow assistant item can be bound to a data model. The binding information can be used to identify data elements associated with data objects or workflow assistant items. The data objects or workflow assistant items can include annotation information that can be used to provide context, layout, or formatting information regarding the data object or workflow assistant item or its consistent data elements or data objects. In some cases, the annotations can represent metadata regarding the data object or workflow assistant item. Example of annotations include a title or description of, or icon associated with, the data object or workflow assistant item, or its component data element (such as labels for data fields). The annotations can also provide for navigation between data element components of the data object or workflow assistant item, or provide or define graphical representations (such as a chart) of data elements of a data object or workflow assistant item.

In addition, the context analyzer 844 can include rules for determining context information from, or regarding, a data object, such as by analyzing a data model with which the data object is associated. In further aspects, the context analyzer 844 can track context information, including data objects, that have been retrieved in response to a search request, or which have been recently used by the user, such as in an application 824. In some implementations, a user can select a data element, data object, or assistant item in the workflow assistant 828 and, using the context information from the context analyzer 844, be taken to a display of an application 824 where the data element or object was initially (or most recently) accessed by, or presented to, the user.

The components of the user interface model 814, and their associated controllers, can be in communication with one or more additional services or other components of the application environment 810, including other controllers associated with components of the user interface 812. For example, the quick create controller 830 can be in communication with a navigation service 845.

The navigation service 845 can, for instance, provide a list of application items or data objects that a user may select via quick create functionality (e.g., through the quick create user interface 830). In turn, the navigation service 845 can be in communication with a data model 846, which can provide read/write access to data used in viewing or creating an assistant item or data object using the quick create user interface 830. The data model 846 can include a HTTPS client 848 and a web socket client 850 that can be used to communicate with other components of the architecture 800, such as the front end server 804.

The data model 846 can be in communication with other components of the application environment 810, including the application controller 826, which can be used to provide read/write access to data used by the user interface 812. The data model 846 can also be in communication with an event service 852, which can track and publish user actions, such as user navigation, selection, and input actions and changes to the canvas 820.

A screen capture service 854 can be in communication with the user interface 812 and the quick create controller 838. The screen capture service 854 can be used, for example, to capture all or a portion of a screen of a base application 824 for addition as a new assistant item, or a new data object or data element. When created as a new data object or data item, a screen capture can be associated with an assistant item or a collection.

In some implementations, the architecture 800 can include multiple client applications 802, which may be operated on various types of computing devices, including desktop computers, laptops, tablet computing devices, or smartphones. In at least some cases, the display presented to a user, such as using the user interface 812 and user interface model 814, can vary depending on a display associated with the client application 802. Thus, normally, a screenshot captured on one device may not be the same as a screenshot captured on another device.

In at least some implementations, the screen capture service 854 can capture a selected portion of a base application in a format that can be display-independent. For example, the client application 802 may include information in the form of webpages (e.g., HTML, XHTML, or XML documents) having a document object model. The screen capture service 854 can traverse the document object model to generate a representation of the screen based on the document object model. In some cases, the document object model can be refactored to create an alternative representation of the document object model. A representation of the document object model can then be used to produce an image. In particular examples, the image can be produced using the html2canvas or canvg libraries.

The application environment 810 can include a data recognition service 856, which can be used, for example, to recognize data objects or data elements in text entered by a user in the workflow assistant 828. The data recognition service 856 can optionally be in communication with the data model 846 and/or other components of the architecture 800, including the front end server 804, the back end server 806, or the database 808.

The data recognition service 856 can include a text analysis client 858 that can parse user text, such as to recognize potential keywords in the text. The text analysis client 858 can generate text analysis results 860 that can be accessed by a search client 862. The text analysis client 858, in at least some examples, can use rules (such as semantic rules) or dictionaries in order to identify keywords.

In at least some cases, a data object can be associated with a dictionary template, such that potential keywords or search terms can be extracted from the data object. The search client 862 can determine whether words, phrases, numbers, or other content of the text analysis results 860 may be associated with, or related to, data objects or data elements used in the architecture 800 and provide search results 864. A matching component 866 can access the search results 864 and text analysis results 860 and, using matching rules 868, determine whether the elements of the text analysis results 860 should be associated with a corresponding element of the search results 864.

If a search result 864 is identified as relevant, it can be identified for the user. For example, the name or other identifier of the search result 864 can be displayed to the user in a particular visual format or with a particular visual identifier, and can be linked to information about the search result. For example, the user may be able to select the search result 864 and be presented with a display of information regarding the search result. In some cases, information regarding the search result 864 (e.g., a data element or a data object) retrieved from an application 824 may be erroneous or incomplete. The matching component 866, or another component of the architecture 800, can retrieve information associated with the data element or data object and correct erroneous information or supply missing information.

Turning to FIG. 8B, details of the front end server 804 and database 808 are shown. The front end server 804 can include a HTTPS provisioning service 870 and a web socket provisioning service 872 that can communicate with the HTTPS client 848 and the web socket client 850, respectively, of the client application 802 (FIG. 8A).

The HTTPS provisioning service 870 and web socket provisioning service 872 can communicate with a data provisioning service 874. The data provisioning service 874 can gather information from other components of the architecture 800 and provide them to the HTTPS provisioning service 870 and the web socket provisioning service 872 to be sent to the client application 802.

The data provisioning service 874 can receive information from a number of components. In some cases, access to particular information, such as data objects, data elements, assistant items, or collections, may be restricted to users having particular access levels. When a request for information is received by the data provisioning service 874, the data provisioning service can access an authorities store or component 876 to determine whether a user associated with the request is allowed to access the requested information.

The data provisioning service 874 can also receive information from a navigation resolution service provider 878 that can be used, for example, to resolve requests made to the navigation service 845 (FIG. 8A) of the client application 802 received from components of the workflow assistant 828 (FIG. 8A). The navigation resolution service provider 878 can provide access to data requested through the data provisioning service 874, including determining which of multiple potential responsive data items should be returned in response to the request.

That is, various users of the software architecture 800 may have different roles. For example, it may be desirable to provide a manager with different information than normal employees. In determining the proper information to return in response to a request, the navigation resolution service provider 878 can access a roles store 880 to retrieve information related to user roles.

A semantic objects store 882 can provide, for example, a description of a particular action to be taken, which can be mapped to other information, such as user roles and applications useable to carry out the described action, to the navigation resolution service provider 878. A target mappings store 884 can, for various types of requests, associate sematic objects describing an action associated with the request, including based on a role of the role store 880 and the description of the action in the semantic objects store 882, with the location or identification or a resource for carrying out the action. A catalog store 886 can organize information associated with a request, including roles of the role store 880, semantic objects associated with the semantic objects store 882, target mappings of the target mapping store 884, and other content, including layouts and other content that can be presented to a user via the user interface model 814 (FIG. 8A).

With reference to FIG. 8A, in some cases, all or a portion of information needed to respond to a request from the client application 802 may be associated with the workflow assistant 828, one or more applications 824, other components of the architecture 800, or combinations thereof. For example, a form created using the quick create user interface model element 830 may also be accessed through one of the applications 824. In other cases, at least certain data objects, data elements, or assistant items of the workflow assistant 828 may be primarily or solely associated with the workflow assistant. Or, the workflow assistant 828 can be responsible for managing such data objects, data elements, assistant items, or collections. A workflow assistant service provider 888 can be responsible for servicing requests for data relating to information managed by the workflow assistant 828. The information, such as information associated with particular data elements, data objects, assistant items, or collections, as well as layout or format information associated with types of data elements, data objects, assistant items, or collections, can be maintained in a store 890.

The front end server 804 can include a notification service 892. The notification service 892 can be in communication with the data provisioning service 874 and the workflow assistant service provider 888. The notification service 892 can track users that are associated with a particular assistant item or collection. The notification service 892 can also manage the storage and delivery of notifications between individuals.

For example, the notification service 892 can receive communications from a first user to a second user, and deliver the communication to the second user when the second user accesses the client application 802. The notification service 892 can track other activity associated with the workflow assistant 828 (FIG. 8A), such as the creation, modification, or deletion of assistant items or collections. The notification service 892 can determine, for example, actions that may be relevant to a user and cause notifications regarding those actions to be sent to the user, such as through the user interface model 814 (FIG. 8A).

The front end server 804 can be in communication with the back end server 806. The back end 806 server can maintain, or mediate access to, information used by the front end server 804. With additional reference to FIG. 8A, the back end server 806 can also be responsible for carrying out all or a portion of the functionality of the workflow assistant 828 or the applications 824. In particular examples, the front end server 804, the back end server 806, or both, can use the NETWEAVER platform of SAP SE, of Walldorf, Germany. The front end server 804, back end server 806, or both, can also use the S/4 HANA application suite, also of SAP SE, of Walldorf, Germany. In further examples, one or more of the client application 802, front end server 804, the back end server 806, and the database 808 can be provided using cloud services, such as using the S/4HANA cloud platform and HANA CLOUD PLATFORM, both of SAP SE of Walldorf, Germany.

The back end server 806 can communicate with the database 808. The database 808 can store information used by other components of the architecture 800, such as in a data store 894 that can include data tables 895. In at least some cases, information regarding information stored in a data table 895, or otherwise stored in the data store 894, can be stored separately from the data itself. For example, such information can be stored as annotations in an annotations store 896.

Storing annotations separately from the underlying data can provide various benefits. For example, rather than storing multiple copies of data in the data tables 895, a single copy of the data can be maintained, which can help maintain the integrity and consistency of the data. Annotations to the data, such as identifying the data as associated with a data object or application item, or other information to be associated with the data, can be stored separately in the annotations store 896. When a user retrieves data from the data tables 895, the data can be associated with any corresponding annotations in the annotations store 896.

The database 808 can also provide services to other components of the architecture 800. For instance, the database 808 can include a text analysis service 898 that can be used, for example, by the text analysis client 858 of the data recognition service 856. In some cases, having services performed by the database 808 can result in more efficient provision of the services, such as based on higher computing power of the database, optimized software tools, or more direct access to needed data.

Although various components are shown in separate boxes, in practice, component boundaries may vary. In addition, particular components may be split into further subcomponents, and components, or portions thereof, may be combined.

The architecture 800, and any of the other inventive systems or architectures described herein, can be implemented in conjunction with any of the hardware components described herein, such as the computing systems described below (e.g., comprising one or more hardware processors, computer-readable media coupled thereto, and the like). In any of the examples herein, instructions for processing data elements, data objects, assistant items, and collections can be stored in one or more computer-readable storage media, machine-readable media, or computer-readable storage devices. The technologies described herein can be generic to the specifics of operating systems, browsers, or hardware and can be applied in any variety of environments to take advantage of the described features.

Example 9—Example Annotation Storage

Figure 9:
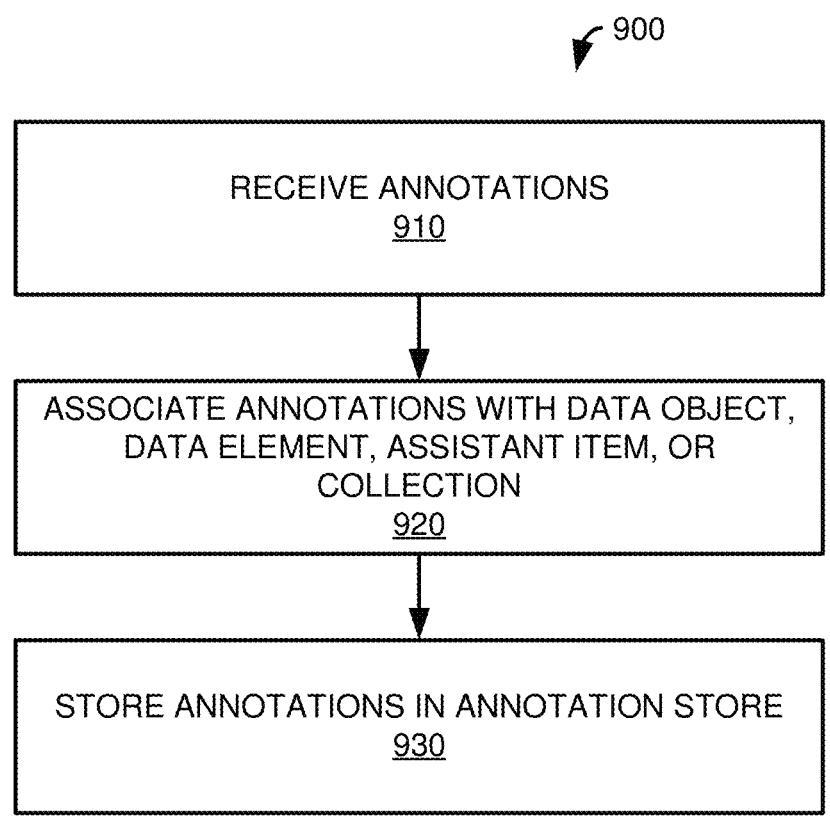
FIG. 9 is a flowchart of an example method of storing annotations associated with a data element, a data object, an assistant item, or a collection according to an embodiment of the present disclosure.

FIG. 9 is a flowchart of an example method 900 of storing annotations to data objects, data elements, assistant items, or collections. At 910, one or more annotations are received. Annotations can include alternate key or identifier values, identifiers for related or dependent data elements, data objects, or assistant items, labels, textual annotations, view or layout information, interpretation information, and access control or permissions information. The annotations are associated with the relevant data element, data object, assistant item, or collection at 920. At 930, the annotations are stored in an annotation store. More particularly, the annotations are stored in a way that does not directly modify the data object, data element, assistant item, or collection itself.

Example 10—Example Annotation Retrieval

Figure 10:
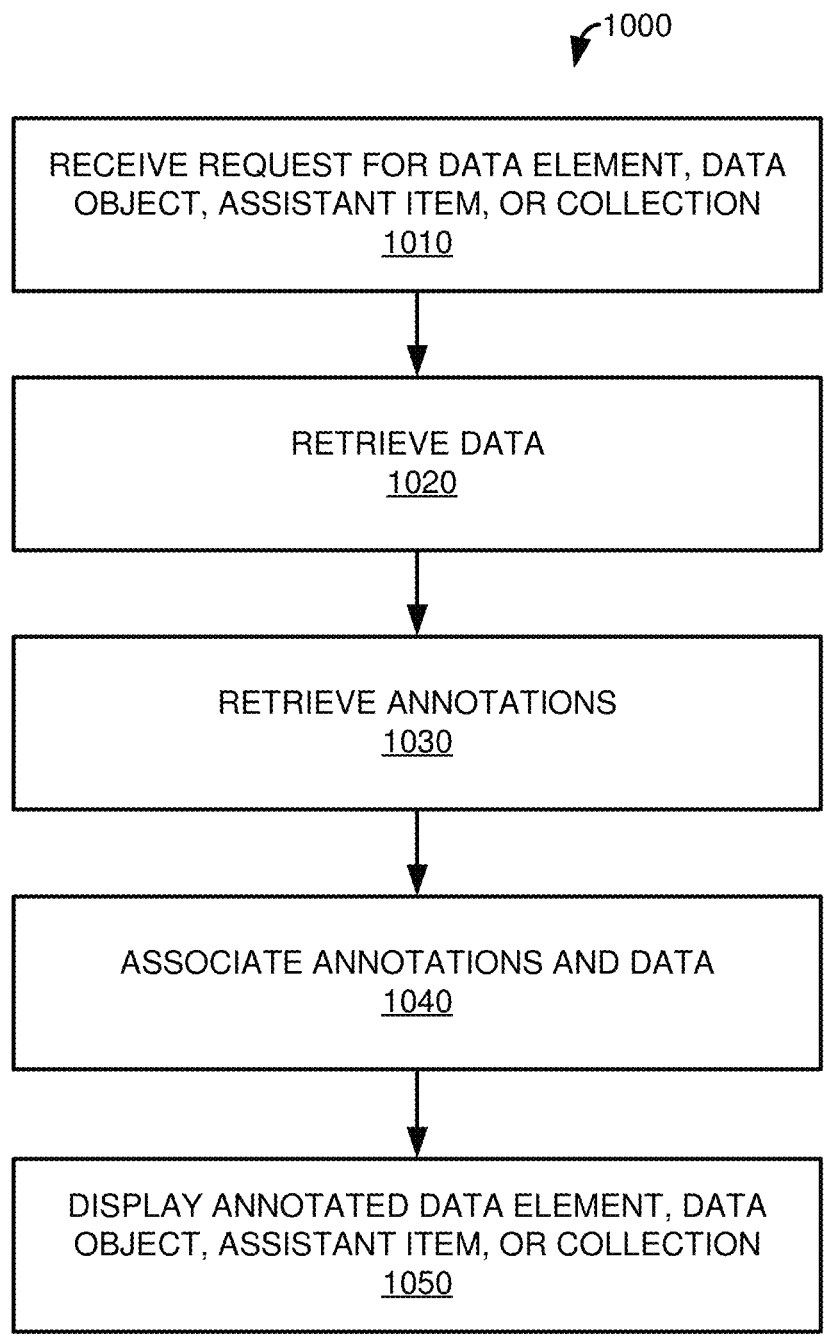
FIG. 10 is a flowchart of an example method of retrieving annotations associated with a data element, a data object, an assistant item, or a collection according to an embodiment of the present disclosure.

FIG. 10 is a flowchart of an example method 1000 for retrieving annotations and associating them with a data object, data element, assistant item, or collection. At 1010, a request is received for a data element, data object, assistant item, or collection. Data associated with the data object, data element, assistant item, or collection is retrieved at 1020. Annotations associated with the data object, data element, assistant item, or collection are retrieved at 1030. At 1040, the annotations are associated with the data element, data object, or assistant item. The annotated data element, data object, assistant item, or collection is displayed at 1050.

Example 11—Example Technical Solution

The technical solution can provide context information from a base application to a workflow assistant in order to facilitate a user's workflow, such as to aid the user in creating assistant items that can allow a user to provide structure to unstructured information. Providing the context information to the workflow assistant can allow the workflow assistant to suggest data elements, data objects, or other information to include in an assistant item or collection. The context information can also suggest actions a user may wish to take, such as a particular application items or data objects the user may wish to create in order to carry out a task or create a memory aid. Because the workflow assistant can access context information of the base application, the content and actions suggested by the workflow assistant can change as the user takes actions in the base application, including switching between different screens or functions of the base application.

The technical solution can also reduce the coupling between data elements, data objects, and assistant items and annotations made by, or otherwise associated with, a particular user. For example, rather than altering an underlying data object or data element, the annotations can be maintained separately from the underlying data, but provided and associated with the underlying data. When the annotations are needed, they can be obtained from an annotations store, the data can be obtained from a data store, and the annotations can be combined with the corresponding data. In this manner, the need to maintain multiple copies of data can be reduced, which can conserve computing system resources and reduce the risk of data corruption (such as can result from having multiple, potentially inconsistent, versions of a data element or data object).

The following features can be implemented to facilitate the implementation of a workflow assistant that dynamically adapts to user actions in a base application and can access content from the base application.

Example 12—Example Feature: Automatic Importation of Data from Base Application to Workflow Assistant In any of the inventive examples herein, data from a base application, such as data elements, data objects, or other context information, can be automatically provided to a workflow assistant. Thus, if a user wishes to take action in the workflow assistant, all or a portion of the data needed to carry out the action may be included in, or suggested to a user for inclusion in, an assistant item. By including data from the base application in the workflow assistant, a user may be able to avoid having to manually enter in at least a portion of the information associated with an assistant item being created or modified.

Example 13—Dynamic Adaptation of Workflow Assistant Using Context Information

In any of the inventive examples herein, the view or actions made available to a user in a workflow assistant may dynamically adjust based on the context of a base application. For example, the actions made available in the workflow assistant may adjust to complement functionality of the base application. Similarly, data elements and data objects presented in the workflow assistant may alter depending on the currently selected screen or functionality of the base application.

Dynamically modifying the workflow assistant can simplify a workflow for a user, as the most relevant information and actions can be made available to a user, rather than requiring the user to manually adjust the workflow assistant, or having to simultaneously present the user with all possible actions, some of which may not be relevant to their current actions in a base application. Similarly, adjusting the data elements and objects presented to the user in the workflow assistant based on the context of the base application can facilitate a user in creating or modifying a collection or an assistant item.

Example 14—Example Feature: Text Analysis

In any of the examples herein, a workflow assistant can analyze textual input from a user to determine data elements, data objects, assistant items, or collections. Recognized items can be added to an assistant item, used to create a new assistant item, or used to suggest actions to a user. Among other benefits, automatically recognizing data elements, data objects, assistant items, or collections in user text can allow more efficient creation or management of assistant items or collections, as the user need not manually associated their textual input with the intended object. In addition, by analyzing user text, the workflow assistant can suggest items that may improve the user's workflow or the effectiveness of a memory aid.

Example 15—Example Feature: Display-Independent Screen Capture

In any of the examples herein, a screen capture service can be provided that allows for a consistent representation of information associated with a display to be generated, even if the display would normally be rendered differently for different displays. For example, information is often rendered differently for mobile devices (e.g., smartphone and tablets) versus desktop or laptop computing devices. While this can be beneficial in providing information to a user in an accessible way, to best accommodate the display currently being used, a screen capture from one device may differ from a screen capture taken on another device. The present disclosure can provide for parsing of a document model object of a webpage to generate a display-independent representation of the screen, which can be rendered as an image.

Example 16—Example Feature: Discrete Annotation Storage

In any of the examples herein, annotations associated with data elements, data objects, assistant items, or collections can be stored separately from the data element, data object, or assistant item itself. When new annotations are created, they can be associated with the appropriate data element, data object, assistant item, or collection, such as using an identifier. The associations can then be stored. When the annotations are to be used in conjunction with the data element, data object, or assistant items, the annotations can be retrieved. The data element, data object, assistant item, or collection can be retrieved. The annotations can then be associated with the corresponding data element, data object, assistant item, or collection, such as using the identifier.

By separating annotations from the corresponding data, the number of copies of data can be reduced, and the integrity of the data better preserved. In some cases, storing annotations separately from underlying data can also enhance system flexibility. For example, annotations may require less storage than storing the annotations along with the underlying data. Annotations may thus be stored on systems where it would be undesirable to maintain a copy of both the annotations and the underlying data.

Example 17—Example Computing Systems

Figure 11:
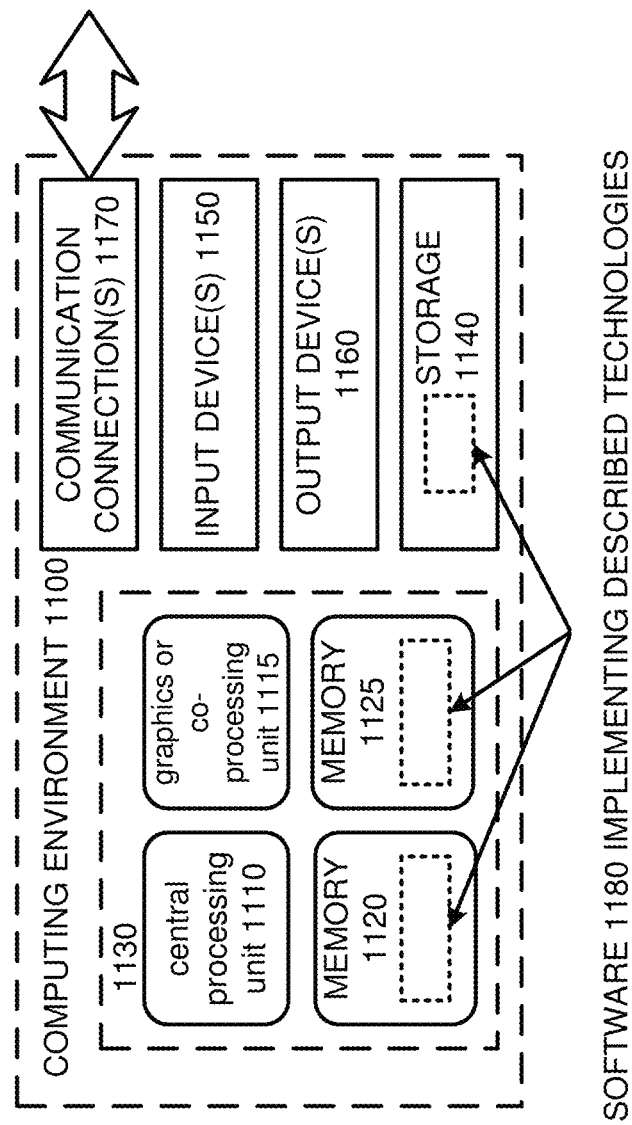
FIG. 11 is a diagram of an example computing system in which described embodiments can be implemented.

FIG. 11 illustrates a generalized example of a suitable computing system 1100 in which several of the described innovations may be implemented. The computing system 1100 is not intended to suggest any limitation as to scope of use or functionality, as the innovations may be implemented in diverse general-purpose or special-purpose computing systems.

With reference to FIG. 11, the computing system 1100 includes one or more processing units 1110, 1115 and memory 1120, 1125. In FIG. 11, this basic configuration 1130 is included within a dashed line. The processing units 1110, 1115 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 11 shows a central processing unit 1110 as well as a graphics processing unit or co-processing unit 1115. The tangible memory 1120, 1125 may be volatile memory (e.g., registers, cache, RAM), non-volatile memory (e.g., ROM, EEPROM, flash memory, etc.), or some combination of the two, accessible by the processing unit(s). The memory 1120, 1125 stores software 1180 implementing one or more innovations described herein, in the form of computer-executable instructions suitable for execution by the processing unit(s).

A computing system may have additional features. For example, the computing system 1100 includes storage 1140, one or more input devices 1150, one or more output devices 1160, and one or more communication connections 1170. An interconnection mechanism (not shown) such as a bus, controller, or network interconnects the components of the computing system 1100. Typically, operating system software (not shown) provides an operating environment for other software executing in the computing system 1100, and coordinates activities of the components of the computing system 1100.

The tangible storage 1140 may be removable or non-removable, and includes magnetic disks, magnetic tapes or cassettes, CD-ROMs, DVDs, or any other medium which can be used to store information in a non-transitory way and which can be accessed within the computing system 1100. The storage 1140 stores instructions for the software 1180 implementing one or more innovations described herein. The storage 1140 does not include signals per se.

The input device(s) 1150 may be a touch input device such as a keyboard, mouse, pen, or trackball, a voice input device, a scanning device, or another device that provides input to the computing system 1100. For video encoding, the input device(s) 1150 may be a camera, video card, TV tuner card, or similar device that accepts video input in analog or digital form, or a CD-ROM or CD-RW that reads video samples into the computing system 1100. The output device(s) 1160 may be a display, printer, speaker, CD-writer, or another device that provides output from the computing system 1100.

The communication connection(s) 1170 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 18—Example Cloud-Supported Environment

Figure 12:
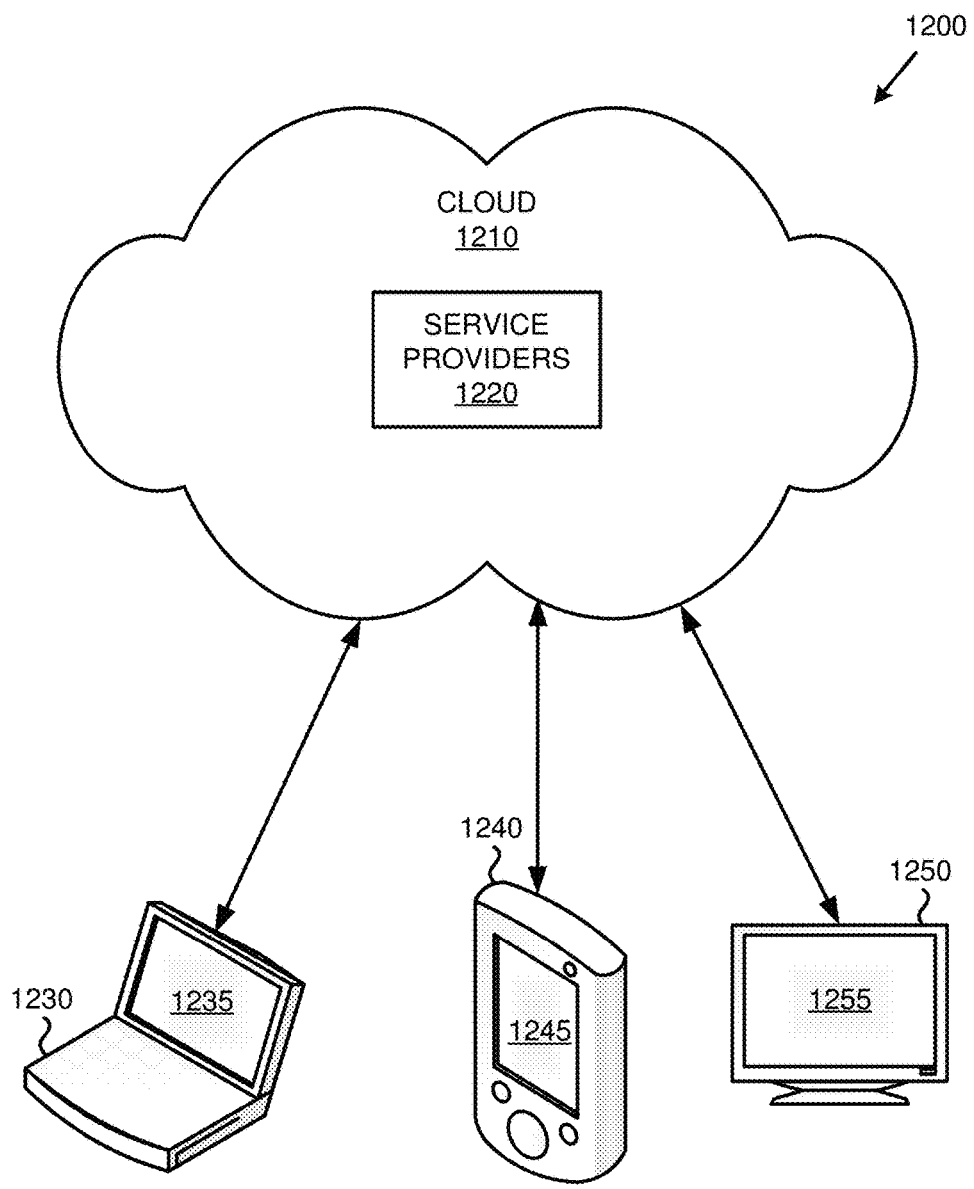
FIG. 12 is an example cloud-support environment that can be used in conjunction with the technologies described herein.

In example environment 1200 of FIG. 12, the cloud 1210 provides services for connected devices 1230, 1240, 1250 with a variety of screen capabilities. Connected device 1230 represents a device with a computer screen 1235 (e.g., a mid-size screen). For example, connected device 1230 could be a personal computer such as desktop computer, laptop, notebook, netbook, or the like. The connected device 1240 represents a device with a mobile device screen 1245 (e.g., a small size screen). For example, the connected device 1240 could be a mobile phone, smart phone, personal digital assistant, tablet computer, and the like. The connected device 1250 represents a device with a large screen 1255. For example, the connected device 1250 could be a television screen (e.g., a smart television) or another device connected to a television (e.g., a set-top box or gaming console) or the like. One or more of the connected devices 1230, 1240, 1250 can include touch screen capabilities. Touchscreens can accept input in different ways. For example, capacitive touchscreens detect touch input when an object (e.g., a fingertip or stylus) distorts or interrupts an electrical current running across the surface. As another example, touchscreens can use optical sensors to detect touch input when beams from the optical sensors are interrupted. Physical contact with the surface of the screen is not necessary for input to be detected by some touchscreens. Devices without screen capabilities also can be used in example environment 1200. For example, the cloud 1210 can provide services for one or more computers (e.g., server computers) without displays.

Services can be provided by the cloud 1210 through service providers 1220, or through other providers of online services (not depicted). For example, cloud services can be customized to the screen size, display capability, and/or touch screen capability of a particular connected device (e.g., connected devices 1230, 1240, 1250).

In example environment 1200, the cloud 1210 provides the technologies and solutions described herein to the various connected devices 1230, 1240, 1250 using, at least in part, the service providers 1220. For example, the service providers 1220 can provide a centralized solution for various cloud-based services. The service providers 1220 can manage service subscriptions for users and/or devices (e.g., for the connected devices 1230, 1240, 1250 and/or their respective users).

Example 19—Computer-Readable Media

Any of the computer-readable media herein can be non-transitory (e.g., volatile memory such as DRAM or SRAM, nonvolatile memory such as magnetic storage, optical storage, or the like) and/or tangible. None of the computer-readable media herein include signals per se. Any of the storing actions described herein can be implemented by storing in one or more computer-readable media (e.g., computer-readable storage media or other tangible media). Any of the things (e.g., data created and used during implementation) described as stored can be stored in one or more computer-readable media (e.g., computer-readable storage media or other tangible media). Computer-readable media can be limited to implementations not consisting of a signal.

Any of the methods described herein can be implemented by computer-executable instructions in (e.g., stored on, encoded on, or the like) one or more computer-readable media (e.g., computer-readable storage media or other tangible media) or one or more computer-readable storage devices (e.g., memory, magnetic storage, optical storage, or the like). Such instructions can cause a computing device to perform the method. The technologies described herein can be implemented in a variety of programming languages.

Example 20—Alternatives

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the following claims. All that comes within the scope and spirit of the claims is therefore claimed as the invention.

What is claimed is:

1. One or more computer-readable media comprising:
   computer-executable instructions rendering a first base display of a base application, the first base display associated with at least one context item, the at least one context item comprising one or more data elements;
   computer-executable instructions automatically retrieving the at least one context item with a workflow assistant;
   computer-executable instructions determining a base display type associated with the first base display;
   computer-executable instructions determining that the base display type associated with the first base display is a first base display type selected from a plurality of base display types, wherein one or more assistant item types are specified for given base display type of the plurality of base display types and wherein at least one assistant item type specified for the first base display type is different than an assistant item type specified for a second base display type of the plurality of base display types;
   computer-executable instructions storing at least one of the one or more data elements of the at least one context item, or an identifier of the at least one of the one or more data elements of the at least one context item, in at least one assistant item specified for the first base display type; and
   computer-executable instructions rendering a workflow assistant display that includes the at least one assistant item and displays the at least one data element in a graphical user interface element visually defining the at least one assistant item.

2. The one or more computer-readable media of claim 1, further comprising:
   computer-executable instructions retrieving the at least one context item associated with the base display with a context analyzer; and
   wherein retrieving the at least one context item with the workflow assistant comprises retrieving the at least one context item from the context analyzer.

3. The one or more computer-readable media of claim 1, wherein rendering the workflow assistant display comprises rendering at least one user interface element allowing a user to take an action, the action being selected based on context information retrieved from the context analyzer.

4. The one or more computer-readable media of claim 3, wherein the action comprises generating an assistant item.

5. The one or more computer-readable media of claim 4, wherein the assistant item comprises structured information comprising the context item.

6. The one or more computer-readable media of claim 5, wherein the assistant item comprises a note, a chat, a screen capture, a form, or a document.

7. The one or more computer-readable media of claim 1, wherein rendering the workflow assistant display comprises displaying the at least one context item associated with the base display.

8. The one or more computer-readable media of claim 1, further comprising:
   computer-executable instructions receiving text input from a user;
   computer-executable instructions parsing the text input to identify keywords;
   computer-executable instructions determining data elements or data objects corresponding to the keywords; and
   computer-executable instructions displaying the data elements or data objects.

9. The one or more computer-readable media of claim 1, further comprising:
   computer-executable instructions adding the assistant item to a collection comprising at least another assistant item.

10. The one or more computer-readable media of claim 1, further comprising:
    computer-executable instructions generating a display-independent representation of the base display.

11. The one or more computer-readable media of claim 10, further comprising:
    computer-executable instructions associating the display-independent representation of the base display with a collection comprising the at least one assistant item.

12. The one or more computer-readable media of claim 1, further comprising:
    computer-executable instructions storing the context information with the at least one assistant item.

13. A system comprising:
    memory;
    one or more hardware processors coupled to the memory;
    one or more computer-readable media storing instructions that, when loaded into the memory, cause the one or more hardware processors to perform operations for:
    determining a base display type associated with a first display being rendered by a base application;
    determining that the base display type associated with the base display type is a first base display type selected from a plurality of base display types, wherein one or more assistant item types are specified for given base display type of the plurality of base display types and wherein at least one assistant item type specified for the first base display type is different than an assistant item type specified for a second base display type of the plurality of base display types;
    determining one or more data elements, data objects, assistant items, or collections associated with the first base display type;
    requesting the determined one or more data elements, data objects, assistant items, or collections associated with the first base display type;
    receiving the requested one or more data elements, data objects, assistant items, or collections associated with the first base display type;
    retrieving at least one annotation associated with the retrieved one or more data elements, data objects, assistant items, or collections associated with the first base display type, the at least one annotation providing context, layout, or formatting information to be applied when processing an annotated data element, data object, assistant item, or collection;
    processing the retrieved annotated data element, data object, assistant item, or collection as specified in the at least one annotation; and
    displaying the annotated data element, data object, assistant item, or collection.

14. The system of claim 13, wherein the annotated data element, data object, assistant item, or collection is stored separately from an annotation of the annotated data element, data object, assistant item, or collection.

15. A method implemented at least in part by a computing system, the method comprising:
    retrieving or generating one or more data objects or one or more first data elements with a first base display of a base application, wherein a data object comprises one or more second data elements;
    determining a base display type associated with the first base display;
    determining that the base display type associated with the first base display is a first base display type selected from a plurality of base display types, wherein one or more assistant item types are specified for given base display type of the plurality of base display types and wherein at least one assistant item type specified for the first base display type is different than an assistant item type specified for a second base display type of the plurality of base display types;
    identifying the one or more data objects or first data elements with a context analyzer;
    retrieving at least one of the one or more data objects or first data elements from the context analyzer with a workflow assistant; and
    creating an assistant item of a type specified for the first base display type and storing the at least one of the one or more data objects or first data elements or a reference to the at least one of the one or more data objects or first data elements.

16. The method of claim 15, further comprising:
    adding the assistant item to a collection comprising at least another assistant item.

17. The method of claim 15, further comprising:
    receiving text input from a user; and
    adding the text input to a collection comprising the assistant item.

18. The method of claim 15, wherein the assistant item comprises a form, the form being determined based at least in part on context information of the base application.

19. The method of claim 18, wherein the at least one of the one or more data objects or first data elements is populated to a field of the form.

20. The method of claim 15, wherein the base application is used by a first user, the method further comprising:
    sending a message to a second user; and
    adding the message to a collection comprising the assistant item.

* * * * *